US012504700B2

(12) United States Patent
Nozaki et al.

(10) Patent No.: US 12,504,700 B2
(45) Date of Patent: Dec. 23, 2025

(54) TONER

(71) Applicant: CANON KABUSHIKI KAISHA, Tokyo (JP)

(72) Inventors: Dai Nozaki, Shizuoka (JP); Kosuke Fukudome, Tokyo (JP); Kozue Uratani, Shizuoka (JP); Takuya Mizuguchi, Shizuoka (JP); Yuta Komiya, Kanagawa (JP); Tomoko Sugita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 830 days.

(21) Appl. No.: 17/520,044

(22) Filed: Nov. 5, 2021

(65) Prior Publication Data

US 2022/0146955 A1 May 12, 2022

(30) Foreign Application Priority Data

Nov. 12, 2020 (JP) ................................ 2020-188685

(51) Int. Cl.
*G03G 9/08* (2006.01)
*G03G 9/097* (2006.01)

(52) U.S. Cl.
CPC ....... *G03G 9/09733* (2013.01); *G03G 9/0821* (2013.01); *G03G 9/09716* (2013.01)

(58) Field of Classification Search
CPC ............. G03G 9/0821; G03G 9/09716; G03G 9/09708; G03G 9/08782; G03G 9/08; G03G 9/08702
See application file for complete search history.

(56) References Cited

U.S. PATENT DOCUMENTS

| | | | |
|---|---|---|---|
| 8,918,035 | B2 | 12/2014 | Hasegawa et al. |
| 9,034,549 | B2 | 5/2015 | Shiotari et al. |
| 9,040,216 | B2 | 5/2015 | Fukudome et al. |
| 9,116,448 | B2 | 8/2015 | Terauchi et al. |
| 9,134,637 | B2 | 9/2015 | Hotta et al. |
| 9,141,012 | B2 | 9/2015 | Moribe et al. |
| 9,244,371 | B2 | 1/2016 | Suzumura et al. |
| 9,256,148 | B2 | 2/2016 | Fujikawa et al. |
| 9,261,806 | B2 | 2/2016 | Moribe et al. |
| 9,285,697 | B2 | 3/2016 | Fukudome et al. |
| 9,304,422 | B2 | 4/2016 | Matsui et al. |
| 9,348,246 | B2 | 5/2016 | Magome et al. |
| 9,354,545 | B2 | 5/2016 | Matsui et al. |
| 9,377,708 | B2 | 6/2016 | Magome et al. |
| 9,423,711 | B2 | 8/2016 | Uratani et al. |
| 9,442,416 | B2 | 9/2016 | Magome et al. |
| 9,470,993 | B2 | 10/2016 | Nishikawa et al. |
| 9,588,450 | B2 | 3/2017 | Tsuda et al. |
| 9,594,323 | B2 | 3/2017 | Fujikawa et al. |
| 9,606,462 | B2 | 3/2017 | Nomura et al. |
| 9,625,842 | B2 | 4/2017 | Uratani et al. |
| 9,658,546 | B2 | 5/2017 | Tanaka et al. |
| 9,658,549 | B2 | 5/2017 | Tanaka et al. |
| 9,804,514 | B2 | 10/2017 | Suzumura et al. |
| 9,841,692 | B2 | 12/2017 | Hasegawa et al. |
| 9,857,707 | B2 | 1/2018 | Tsuda et al. |
| 9,880,478 | B2 | 1/2018 | Shimano et al. |
| 9,897,932 | B2 | 2/2018 | Hotta et al. |
| 9,964,874 | B2 | 5/2018 | Suzumura et al. |
| 9,971,263 | B2 | 5/2018 | Fukudome et al. |
| 10,101,683 | B2 | 10/2018 | Nishikawa et al. |
| 10,197,934 | B2 | 2/2019 | Matsui et al. |
| 10,228,627 | B2 | 3/2019 | Nagashima et al. |
| 10,228,630 | B2 | 3/2019 | Mizuguchi et al. |
| 10,241,430 | B2 | 3/2019 | Kimura et al. |
| 10,289,016 | B2 | 5/2019 | Fukudome et al. |
| 10,295,921 | B2 | 5/2019 | Ohmori et al. |
| 10,310,397 | B2 | 6/2019 | Sano et al. |
| 10,437,165 | B2 | 10/2019 | Shimano |
| 10,545,420 | B2 | 1/2020 | Kinumatsu et al. |
| 10,578,990 | B2 | 3/2020 | Tsuda et al. |
| 10,698,327 | B2 | 6/2020 | Nagashima et al. |
| 10,782,623 | B2 | 9/2020 | Yoshiba et al. |
| 10,845,722 | B2 | 11/2020 | Nishikawa et al. |
| 10,859,933 | B2 | 12/2020 | Kinumatsu et al. |

(Continued)

FOREIGN PATENT DOCUMENTS

| | | | |
|---|---|---|---|
| CN | 103097962 | A | 5/2013 |
| CN | 110018621 | A | 7/2019 |

(Continued)

OTHER PUBLICATIONS

JP-2017102398-A Translation (Year: 2024).*

(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

A toner comprising a toner particle comprising a binder resin, a hydrocarbon wax A, and an ester wax B, wherein assuming that a ratio of a peak intensity attributed to the hydrocarbon wax A to a peak intensity attributed to the binder resin in heating IR measurement in which the toner is held at 100° C. for 10 min is I, where an initial peak intensity ratio upon heating to 100° C. is denoted by I(ini) and a peak intensity ratio upon heating to 100° C. and holding for 10 min is denoted by I(10 min), the I(ini) and the I(10 min) satisfy a following formula (1):

$$I(\text{ini})/I(10\ \text{min}) \leq 0.95 \quad (1).$$

11 Claims, No Drawings

(56) References Cited

U.S. PATENT DOCUMENTS

| | | | | |
|---|---|---|---|---|
| 10,877,387 | B2 | 12/2020 | Fukudome et al. | |
| 11,003,103 | B2 | 5/2021 | Kinumatsu et al. | |
| 11,092,905 | B2 | 8/2021 | Fukudome et al. | |
| 11,099,493 | B2 | 8/2021 | Komiya et al. | |
| 11,112,708 | B2 | 9/2021 | Uratani et al. | |
| 11,181,839 | B2 | 11/2021 | Yamashita et al. | |
| 11,181,840 | B2 | 11/2021 | Nagata et al. | |
| 11,181,844 | B2 | 11/2021 | Nagaoka et al. | |
| 11,181,846 | B2 | 11/2021 | Kinumatsu et al. | |
| 2009/0061345 | A1 | 3/2009 | Yamada | |
| 2011/0311910 | A1 * | 12/2011 | Matsui | G03G 9/0819 430/108.4 |
| 2013/0171552 | A1 | 7/2013 | Yoshizaki et al. | |
| 2013/0244157 | A1 * | 9/2013 | Inoue | G03G 9/08782 430/105 |
| 2014/0099578 | A1 | 4/2014 | Hotta et al. | |
| 2015/0185658 | A1 | 7/2015 | Wakabayashi et al. | |
| 2016/0378003 | A1 | 12/2016 | Arimura et al. | |
| 2017/0115583 | A1 | 4/2017 | Tsuchihashi | |
| 2017/0336726 | A1 | 11/2017 | Hasegawa et al. | |
| 2020/0041922 | A1 | 2/2020 | Shimano | |
| 2020/0409282 | A1 | 12/2020 | Unno et al. | |
| 2021/0080846 | A1 | 3/2021 | Mizuguchi et al. | |
| 2021/0356878 | A1 | 11/2021 | Mizuguchi et al. | |
| 2023/0127563 | A1 | 4/2023 | Phua | |

FOREIGN PATENT DOCUMENTS

| | | | | |
|---|---|---|---|---|
| EP | 3 674 799 | A1 | | 7/2020 |
| JP | 2006-84674 | A | | 3/2006 |
| JP | 2009-58849 | A | | 3/2009 |
| JP | 2013-214005 | A | | 10/2013 |
| JP | 2017102398 | A | * | 6/2017 |
| JP | 2018-173499 | A | | 11/2018 |
| JP | 2019-86642 | A | | 6/2019 |
| JP | 2019086641 | A | * | 6/2019 |
| JP | 2023-517088 | A | | 4/2023 |
| JP | 2024-60647 | A | | 5/2024 |

OTHER PUBLICATIONS

CAS 61682-73-3 (Year: 2024).*

JP-2019086641-A Translation (Year: 2025).*

U.S. Appl. No. 17/519,938, Yuta Komiya, filed Nov. 5, 2021.

U.S. Appl. No. 17/526,486, Yoshitaka Suzumura, filed Nov. 15, 2021.

U.S. Appl. No. 17/643,525, Kenta Kamikura, filed Dec. 9, 2021.

U.S. Appl. No. 17/643,949, Kozue Uratani, filed Dec. 13, 2021.

Robert F. Fedors, "A Method for Estimating Both the Solubility Parameters and Molar Volumes of Liquids", Polym. Eng. Sci., vol. 14, No. 2 (1974) 147-54.

CAS SciFinder 61682-73-3 (Year 2024), pp. 1-3.

Plastic Additive, China Academic Journal Electronic Publishing House, pp. 51-60.

* cited by examiner

TONER

BACKGROUND OF THE INVENTION

Field of the Invention

The present disclosure relates to a toner to be used in an image forming method such as an electrophotographic method.

Description of the Related Art

In recent years, in electrophotographic image forming apparatuses such as copiers and printers, user demands for higher speed, higher image quality, and longer life have been growing, and energy saving has been increasingly emphasized due to increasing momentum for global environmental conservation. In addition, the number of users who preferentially use a double-sided printing mode is increasing due to the global trend of resource protection, and it is necessary to exhibit stable performance in a wide variety of usage environments employed by the users.

The size of the main body is required to be reduced from the viewpoint of space saving. In order to reduce the size of the main body, it is necessary to optimally arrange each component to eliminate dead space and also to minimize the number of components required, and cooling fans, air passages, and the like are likely candidates for elimination. In such a case, the heat inside of the main body is difficult to cool down, and since the printing speed will further increase, the paper on which the toner has been printed will be gradually stacked on an output tray without cooling down the heat generated at the time of fixing.

As for the performance required of toners in such electrophotographic image forming apparatuses, it is necessary to improve low-temperature fixability and prevent paper sheets from adhering to each other in a paper output tray. As mentioned above, when the paper after printing is stacked on the output tray without the heat being cooled off due to the miniaturization and speeding up of the main body, the toner does not solidify on the output tray, so the stacked paper sheets of image adherence are likely to occur. This effect is particularly remarkable in the case of toners having improved low-temperature fixability that melt at a lower temperature.

For example, Japanese Patent Application Publication No. 2019-086642 proposes a toner in which a wax having high plasticity with respect to a binder resin and a wax having high releasability are used in combination in order to improve low-temperature fixability, so that the binder resin can be easily melted.

Further, Japanese Patent Application Publication No. 2018-173499 proposes a toner in which a wax having high plasticity with respect to the binder resin and a crystalline polyester resin are included, and the storage elastic moduli at 100° C., 60° C., and 50° C. are controlled within certain ranges, thereby achieving both the improvement of low-temperature fixability and suppression of output paper sticking. These techniques produce a certain effect on achieving both improvement of low-temperature fixability and suppression of output paper sticking.

SUMMARY OF THE INVENTION

Although the low-temperature fixability is greatly improved by the technique discloses Japanese Patent Application Publication No. 2019-086642, this technique is insufficient in achieving also the suppression of output paper sticking.

Further, regarding Japanese Patent Application Publication No. 2018-173499, in a miniaturized main body with increased operation speed, such as described above, under a usage environment in which paper is stacked on a paper output tray in a double-sided printing mode, further improvement is required to achieve both low-temperature fixability and output paper sticking suppression.

The present disclosure provides a toner capable of achieving both low-temperature fixability and output paper sticking suppression in a usage environment in which paper is stacked on a paper output tray in a double-sided printing mode in a miniaturized main body of a high-speed image forming apparatus.

Specifically, provided is a toner that has favorable fixability (tape peeling resistance) even in a high-speed process and is less likely to cause output paper sticking to images in a double-sided printing mode.

A toner comprising a toner particle comprising a binder resin, a hydrocarbon wax A, and an ester wax B, wherein assuming that a peak intensity ratio of a peak intensity attributed to the hydrocarbon wax A to a peak intensity attributed to the binder resin in heating IR measurement in which the toner is held at 100° C. for 10 min is I, an initial peak intensity ratio upon heating to 100° C. is I(ini), and a peak intensity ratio upon heating to 100° C. and holding for 10 min is I(10 min), the I(ini) and the I(10 min) satisfy a following formula (1):

$$I(\text{ini})/I(10\text{ min})\leq 0.95 \quad (1).$$

The present disclosure can provide a toner capable of achieving both low-temperature fixability and output paper sticking suppression in a usage environment in which paper is stacked on a paper output tray in a double-sided printing mode in a miniaturized main body of a high-speed image forming apparatus.

Further features of the present invention will become apparent from the following description of exemplary embodiments.

DESCRIPTION OF THE EMBODIMENTS

In the present disclosure, the description of “from XX to YY” or “XX to YY” indicating a numerical range means a numerical range including a lower limit and an upper limit which are end points, unless otherwise specified. When the numerical range is described step by step, the upper and lower limits of each numerical range can be arbitrarily combined.

The present inventors have diligently studied a toner that has excellent low-temperature fixability in a miniaturized high-speed printer and is less likely to cause image sticking when paper is stacked on the output tray in the double-sided printing mode.

For low-temperature fixing, it is necessary for the toner to be instantly melted by a fixing roller in a high-speed process. Considering the balance between storage stability and durability, by including a finely dispersed crystalline material, that is, a wax having plasticity with respect to the binder resin in a toner particle, it is possible to achieve melting even in a high-speed process at a low temperature. Further, by including the release wax, the release wax migrates to the surface of an image at the time of fixing, and the release effect is exerted on a fixing roller, so that low-temperature fixing can be achieved.

It is important to balance the amounts of these waxes. If the amount of plastic wax is too small, the effect of melting at low temperature cannot be exhibited, and if the amount of plastic wax is too large, the heat-resistant storage stability is lowered and hot offset occurs at the time of fixing. Regarding hot offset, the release wax can ensure the releasability from the fixing roller, but where the amount of release wax is too small, the release effect cannot be exhibited, and if the amount of release wax is too large, the release effect is also exhibited between the paper sheets and, conversely, hinders the fixation.

In other words, as a result of both the plastic wax and the release wax playing the respective roles at the optimum amounts and timing, low-temperature fixability can be also achieved even in a miniaturized apparatus and high-speed process.

However, it has become difficult to suppress output paper sticking during double-sided printing because the toner has such improved low-temperature fixability. Where continuous printing is performed in the double-sided printing mode and paper is stacked on the output tray in a smaller and faster printer, the temperature of the paper immediately after output may reach about 100° C., and the temperature near the center of the paper bundle may reach about 80° C.

It was found that in such cases the heat does not cool off easily and the printed toner remains warmed for 10 min or more, although this depends on the basis weight of the stacked paper and the number of stacked sheets. In that state, the wax is melted and the toner is maintained in a soft state, so that the toner-to-paper output paper sticking in the stacked paper (which is likely to occur in double-sided printing of character images), and also toner-to-toner output paper sticking (which is likely to occur in double-sided printing of solid images) are likely to occur.

In order to solve such a problem, the present inventors focused on the action of the release wax. Specifically, the idea was that if the release effect of the release wax can be maximized, the occurrence of output paper sticking can be suppressed even if the toner is in a molten state in the paper bundle on the output tray. Accordingly, the behavior of the release wax from inside the fixing nip and onto the paper output tray was studied.

As a result, it was confirmed that the release wax migrates to the toner surface at the time of fixing and exerts a release effect on the surface of the fixing roller, but most of the release wax migrates to the fixing roller in contact at that time. Therefore, the present inventors considered that the amount of release wax remaining on the image surface is reduced, and it is difficult to exert the release effect in the toner molten state when paper is stacked on the output tray.

Meanwhile, when the amount of the release wax contained in the toner particles is simply increased in order to maintain the release effect even on the paper output tray, the release effect with the paper is large as described above, but the fixability is lowered. Further, where the amount of the release wax is too large, the quality of the toner is adversely affected, which causes a decrease in durability.

Accordingly, the present inventors have come up with an idea of stepwise controlling the amount of the release wax migrating to the toner surface in order to achieve both low-temperature fixability and output paper sticking suppression. That is, the present inventors have conceived of a toner such that in the fixing nip, only the necessary and sufficient amount of the release wax migrates to the surface, and the amount of the release wax on the surface can be increased by allowing the release wax to stand thereafter in a heat storage state on the paper output tray. It has been found that this can result in effective exhibition of the release effect of the release wax both in the fixing nip and at the time of paper stacking on the output paper tray. Due to this effect, it is possible to achieve both low-temperature fixability and output paper sticking suppression at the time of double-sided printing.

That is, it was found that both low-temperature fixability and output paper sticking suppression at the time of double-sided printing were improved by including the release wax and the plastic wax into a toner particle and, regarding the amount of the release wax on the toner surface, controlling the amount of the release wax that migrated to the toner surface from immediately after heating to 100° C. to 10 min later within a specific range, and this finding led to the creation of the abovementioned toner.

That is, the present disclosure relates to a toner comprising a toner particle including a binder resin, a hydrocarbon wax A, and an ester wax B, wherein assuming that the peak intensity ratio of a peak intensity attributed to the hydrocarbon wax A to a peak intensity attributed to the binder resin in heating IR measurement in which the toner is held at 100° C. for 10 min is I, where an initial peak intensity ratio upon heating to 100° C. is denoted by I(ini) and a peak intensity ratio upon heating to 100° C. and holding for 10 min is denoted by I(10 min), the I(ini) and the I(10 min) satisfy a following formula (1).

$$I(\text{ini})/I(10\ \text{min})\leq 0.95 \tag{1}$$

The details of the heating IR measurement will be described hereinbelow, but this method makes it possible to capture changes in the amount of hydrocarbon wax A on the toner surface during heating. The I value is the ratio of the peak intensity attributed to the hydrocarbon wax A to the peak intensity attributed to the binder resin in the heating IR measurement, and is an index of the amount of the hydrocarbon wax A on (near) the toner surface.

The initial peak intensity ratio upon heating to 100° C. is denoted by I(ini) and the peak intensity ratio upon heating to 100° C. and holding for 10 min is denoted by I(10 min). It is necessary that the value of I(ini) and the value of 410 min) satisfy the formula (1).

Where I(ini)/I(10 min) is 0.95 or less, a part of the hydrocarbon wax A having a release effect migrates to the toner surface in the fixing nip to exert a release effect on the fixing roller. After that, the hydrocarbon wax A gradually migrates to the surface while being allowed to stand thereafter in a heat storage state on the paper output tray, the release effect is exerted even between the stacked images, and it is possible to suppress the output paper sticking even at the time of double-sided printing. Further, I(ini)/I(10 min) is preferably 0.94 or less, and more preferably 0.93 or less. The lower limit of I(ini)/I(10 min) is not particularly limited, but is preferably 0.70 or more, more preferably 0.78 or more, and further preferably 0.80 or more.

As one of the means for exhibiting the above characteristics, it is preferable that the toner particle includes an inorganic particle C which have been hydrophobized with a hydrophobizing treatment agent. The hydrophobizing treatment agent preferably has an alkyl chain.

Then, for the migration control of the hydrocarbon wax A, it is preferable to control the SP value of the hydrocarbon wax A, the ester wax B, and the alkyl chain of the hydrophobizing treatment agent in the inorganic particles C.

Further, in order to set I(ini)/I(10 min) in a preferable range, it is preferable that ΔSP1 and ΔSP2 satisfy following formulas (2) to (4).

ΔSP1 is the difference (SPa−SPc) between the SP value (SPa) $(cal/cm^3)^{1/2}$ of the hydrocarbon wax A and the SP value (SPc) $(cal/cm^3)^{1/2}$ of the alkyl chain of the hydrophobizing treatment agent in the inorganic particles C.

Further, ΔSP2 is the difference (SPb−SPa) between the SP value (SPb) $(cal/cm^3)^{1/2}$ of the ester wax B and the SP value (SPa) of the hydrocarbon wax A.

$$\Delta SP1-\Delta SP2\leq 0.10 \quad (2)$$

$$0.41\leq\Delta SP2\leq 1.00 \quad (3)$$

$$0.10\leq\Delta SP1\leq 0.82 \quad (4)$$

The SP value is also called a solubility parameter, and is a numerical value used as an index of solubility or affinity indicating how much a substance dissolves in a certain substance. Those with similar SP values have high solubility and affinity, and those with different SP values have low solubility and affinity. The SP value is calculated based on a commonly used Fedors method [Poly. Eng. Sci., 14 (2) 147 (1974)]. The unit of the SP value is $(cal/cm^3)^{1/2}$.

The SP value (SPa) of the hydrocarbon wax A is usually about from 8.30 to 8.50. By designing the SP value of the hydrocarbon wax A, the SP value of the ester wax B, and the SP value of the alkyl chain of the hydrophobizing treatment agent in the inorganic particles C within the above ranges, the amount of the hydrocarbon wax in the vicinity on (close to) the toner surface 10 min after heating at 100° C. can be easily increased.

By satisfying the formula (3), the hydrocarbon wax A has an affinity with the ester wax B, so that the action of migrating to the toner surface at the time of fixing is suppressed and the hydrocarbon wax A is retained inside. Where ΔSP2 is set to 0.41 or more, the waxes do not mix and remain in the form of domains, and by setting ΔSP2 to 1.00 or less, a suitable affinity works.

Since the ester wax B is compatible with the binder resin, the ester wax B is in a state of being mixed with the binder resin in a molten state at a high temperature. Therefore, the hydrocarbon wax A acts to be retained inside by the ester wax B. ΔSP2 is more preferably from 0.43 to 0.60.

By setting ΔSP1 in the range from 0.10 to 0.82, the hydrocarbon wax A is attracted to the inorganic particles due to the affinity with the alkyl chain of the hydrophobizing treatment agent of the inorganic particles C. By setting ΔSP1 to 0.10 or more, the hydrocarbon wax A and the inorganic particles are not completely mixed, and by setting ΔSP1 to 0.82 or less, a suitable affinity works. ΔSP1 is more preferably from 0.15 to 0.55.

Further, by setting the relationship of ΔSP1−ΔSP2≤0.10, a difference in the interaction is attained and a gradient is created. As a result, a driving force is generated that pulls the hydrocarbon wax A toward the inorganic particles C while the hydrocarbon wax A is being attracted by the ester wax B and the inorganic particles C. The driving force transfers the hydrocarbon wax A retained inside the toner due to affinity with the ester wax B or the inorganic particles C to the surface of the image that is allowed to stand in a heat storage state on the paper output tray. ΔSP1−ΔSP2 is more preferably 0.08 or less. The lower limit is not particularly limited, but is preferably −0.60 or higher, and more preferably −0.50 or higher.

It is preferable to set the SP value of each component in the above range in order to satisfy the relationship of the formula (1).

By establishing the relational expression of the formula (1), only the amount of hydrocarbon wax A necessary and sufficient for the release from the fixing roller is transferred to the toner surface to exhibit the release effect at the time of fixing. Further, the hydrocarbon wax A migrates to the toner surface in the image allowed to stand in a heat storage state in the paper bundle stacked on the paper output tray, so that the output paper sticking is also suppressed.

The toner particle includes the ester wax B. The ester wax B has the effect of plasticizing the binder resin at the time of fixing, and is necessary for achieving low-temperature fixing. The plasticizing effect of the ester wax B is realized by compatibility with the binder resin. The ester wax B is not particularly limited as long as the ester wax B has the above characteristics, and a known wax can be used.

For example, in addition to a monofunctional ester wax, a polyfunctional ester wax such as a bifunctional ester wax or a tetrafunctional or hexafunctional ester wax can also be used. Specific examples include esterification products of an alcohol component, for example, a monofunctional alcohol such as lauryl alcohol, stearyl alcohol, behenyl alcohol, and the like, a bifunctional alcohol such as ethylene glycol, diethylene glycol, 1,3-propanediol, 1,4-butanediol, 1,6-hexanediol, and the like, a polyfunctional alcohol such as glycerin, pentaerythritol, dipentaerythritol, and the like, and an aliphatic monocarboxylic acid such as palmitic acid, stearic acid, bechenic acid, and the like.

The number of carbon atoms in the hydrocarbon chain of a long-chain fatty acid or alcohol is preferably from 10 to 30, and more preferably from 12 to 24. In particular, a bifunctional ester wax is preferable, and the range of the SP value described hereinbelow is preferably 7.0 to 10.0, and more preferably 8.4 to 9.0.

The molecular weight of the ester wax B is preferably 500 to 1000, and more preferably 550 to 800. By setting the molecular weight in this range, the plasticizing effect on the binder resin is increased, and the contribution to low-temperature fixability is increased. Specifically, it is more preferable to include an ester compound of a diol and an aliphatic monocarboxylic acid.

Further, the ester wax B is preferably an ester compound of a diol having from 2 to 6 carbon atoms and an aliphatic monocarboxylic acid having from 16 to 22 carbon atoms.

Examples of the diol having from 2 to 6 carbon atoms include ethylene glycol, diethylene glycol, 1,3-propanediol, 1,4-butanediol, 1,6-hexanediol, and the like.

Examples of the aliphatic monocarboxylic acid having from 16 to 22 carbon atoms include aliphatic monocarboxylic acids such as palmitic acid, stearic acid, behenic acid, and the like.

The amount of the ester wax B in the toner particle is preferably from 1.0 part by mass to 45.0 parts by mass, more preferably from 5.0 parts by mass to 35.0 parts by mass, and even more preferably from 10.0 parts by mass to 30.0 parts by mass with respect to 100.0 parts by mass of the binder resin.

The method for analyzing the molecular weight of ester wax B is not particularly limited, and any method suitable for detecting the mass of ester wax may be used. Specific examples include a method of detecting molecular ions by using a mass spectrometer ISQ manufactured by Thermo Fisher Scientific Inc. and a direct data introduction method, and a method of detecting molecular ions with MALDI-TOFMS manufactured by Bruker Daltonics Co. by using 2,5-dihydroxybenzoic acid (DHBA) as a matrix and sodium trifluoroacetate as an ionizing agent.

The SP value (SPb) of the ester wax B is preferably from 8.60 to 9.20, and more preferably from 8.80 to 9.00.

Further, the toner particle includes the hydrocarbon wax A. As described above, the hydrocarbon wax A exerts a release effect with the fixing roller surface in the fixing nip, and thus is necessary to ensure a toner-paper and toner-toner release effect in the image allowed to stand in the heat storage state on the output paper tray.

A known hydrocarbon wax can be used as the hydrocarbon wax A, and examples thereof include petroleum wax, hydrocarbon wax, polyolefin wax, and the like. For example, low molecular weight polyethylene, low molecular weight polypropylene, microcrystalline wax, paraffin wax, Fischer-Tropsch wax, and the like can be mentioned.

The amount of the hydrocarbon wax A in the toner particle is preferably from 0.5 parts by mass to 20.0 parts by mass, more preferably from 3.0 parts by mass to 15.0 parts by mass, and even more preferable from 4.0 parts by mass to 10.0 parts by mass with respect to 100.0 parts by mass of the binder resin.

Further, it is preferable that the toner particle includes the hydrophobized inorganic particles C.

Examples of the inorganic particles include metal oxides of metals such as Fe, Si, Ti, Sn, Zn, Al, Ce, and the like, and known particles can be used. A method for coating the surface of the inorganic particles is not particularly limited as long as it is a treatment method using a surface hydrophobizing treatment agent.

Examples of suitable methods include a wet method in which a powder to be treated is dispersed in a solvent such as water or an organic solvent with a mechanochemical type mill such as a ball mill or a sand grinder, followed by mixing with a hydrophobizing treatment agent, removal of the solvent, and drying; a dry method in which a powder to be treated and a hydrophobizing treatment agent are mixed with a Henschel mixer or super mixer and then dried; a method in which a powder to be treated and a surface hydrophobizing treatment agent are brought into contact with each other for treatment in a high-speed air stream in a jet mill or the like; a method in which the adhesion between the particle surface and a hydrophobizing treatment agent is improved while disaggregating the particles by the shearing action and the compressive action of a wheel-type kneader such as a Mix-Muller; and the like.

Further, it is more preferable that the hydrophobized inorganic particle C be a magnetic body.

Examples of magnetic bodies include magnetic iron oxides such as magnetite, maghemite, and ferrite, and magnetic iron oxides including other metal oxides; metals such as Fe, Co, and Ni, or alloys or these metals with metals such as Al, Co, Cu, Pb, Mg, Ni, Sn, Zn, Sb, Be, Bi, Cd, Ca, Mn, Se, Ti, W, and V, and mixtures thereof.

Among these, magnetite is preferable. Magnetite may have a polyhedron, octahedron, hexahedron, spherical, needle, and flake shape, but from the viewpoint of increasing the image density because the cohesiveness is suppressed, shapes that ensure a small contact area between magnetic bodies, such as a hexahedron and a sphere, are preferable.

The number average particle diameter of primary particles of the inorganic particles C is preferably from 50 nm to 500 nm, more preferably from 100 nm to 300 nm, and further preferably from 150 nm to 250 nm.

When the inorganic particles C are magnetic bodies, the amount of the magnetic bodies is preferably from 35 parts by mass to 100 parts by mass, and more preferably from 45 parts by mass to 95 parts by mass with respect to 100 parts by mass of the binder resin.

The amount of the magnetic bodies in the toner can be measured using a thermal analyzer TGA Q5000IR manufactured by PerkinElmer Corp. In the measuring method, the toner is heated from normal temperature to 900° C. at a heating rate of 25° C./min in a nitrogen atmosphere, the mass loss of 100° C. to 750° C. is set as the mass of the components of the toner other than the magnetic bodies, and the residual mass is taken as the mass of magnetic bodies.

The following method can be exemplified as a method for producing magnetic bodies.

An aqueous solution including ferrous hydroxide is prepared by adding an alkali such as sodium hydroxide to a ferrous salt aqueous solution in an equivalent or larger amount with respect to the iron component. Air is blown while maintaining the pH of the prepared aqueous solution at pH 7 or higher, and an oxidation reaction of ferrous hydroxide is performed while the aqueous solution is heated to 70° C. or higher to first generate seed crystals that form the core of the magnetic bodies.

Next, an aqueous solution including equivalent amount of ferrous sulfate based on the amount of alkali added previously is added to the slurry-like liquid including seed crystals. The reaction of ferrous hydroxide is promoted while blowing air and maintaining the pH of the liquid at 5 to 10, and magnetic iron oxide particles are grown around the seed crystals. At this time, it is possible to control the shape and magnetic characteristics of the magnetic bodies by selecting arbitrary pH, reaction temperature, and stirring conditions. As the oxidation reaction progresses, the pH of the liquid shifts to the acidic side, but it is preferable that the pH of the liquid does not become less than 5. Magnetic bodies can be obtained by filtering, washing, and drying the magnetic iron oxide particles thus obtained by conventional methods.

The hydrophobizing treatment of the inorganic particles C is not particularly limited, but it is preferable that the inorganic particles C be surface-treated with a hydrophobizing treatment agent that is represented by the formula (I) described hereinbelow and has a relatively large carbon number.

As a result, the hydrophobizing treatment agent can be uniformly reacted with the particle surface of the inorganic particles C to achieve high hydrophobicity.

The inorganic particles C are preferably inorganic particles that have been hydrophobized using an alkyltrialkoxysilane coupling agent represented by the following formula (I) as a hydrophobizing treatment agent. The inorganic particle C preferably has an inorganic particle and a reaction product of a hydrophobizing treatment agent on the surface of the inorganic particle.

$$C_pH_{2p+1}\text{—Si—}(OC_qH_{2q+1})_3 \quad \text{(I)}$$

In the formula (I), p indicates an integer of from 6 to 12 (preferably from 8 to 12, more preferably from 10 to 12), and q indicates an integer of from 1 to 3 (preferably 1 or 2, more preferably 1).

Where p in the above formula is 6 or more, sufficient hydrophobicity can be imparted, while where p is 12 or less, uniform treatment can be performed on the surface of the inorganic particles, and the coalescence of the inorganic particles can be advantageously suppressed.

The SP value of the alkyl chain of the hydrophobizing treatment agent in the inorganic particles C is preferably 7.50 to 8.50, and more preferably 7.80 to 8.20.

The alkyl chain of the hydrophobizing treatment agent in the inorganic particles C preferably represents an alkyl chain in the hydrophobizing treatment agent (and the reaction product thereof) present on the surface of the inorganic particles C, and is more preferably an alkyl group bonded to Si of the hydrophobizing treatment agent (and the reaction product thereof) represented by the formula (I).

The amount of the hydrophobizing treatment agent is preferably from 0.3 parts by mass to 2.0 parts by mass, and more preferably from 0.6 parts by mass to 1.5 parts by mass with respect to 100 parts by mass of the untreated inorganic particles.

When a toner is produced by the suspension polymerization method described hereinbelow, the hydrophobized inorganic particles are unevenly present like a surfactant near the surface of the toner particles due to the effect of the hydrophobicity created by the alkyl substituent and the hydrophilicity of the remaining hydroxyl groups in the process of toner formation. The presence of the magnetic bodies near the surface has the effect of suppressing the outmigration of the wax onto the toner surface when the toner placed in a harsh environment such as 40° C. and 95% RH.

Where the wax outmigrates to the toner surface when the toner is allowed to stand, the amount of hydrocarbon wax migrated to the surface in the image allowed to stand in a heat storage state on the output paper tray is unlikely to increase. By enabling the presence of inorganic particles close to the surface, the outmigration of the wax to the toner surface occurring when the toner is allowed to stand under a harsh environment is suppressed, so that the effect of suppressing output paper sticking can be further maintained.

Further, the binder resin preferably includes a monomer unit derived from styrene in order to sufficiently exert the plasticizing effect of the ester wax.

More preferably, the binder resin includes a styrene acrylic copolymer. The styrene acrylic copolymer is a copolymer of a styrene-based monomer and an acrylic-based monomer (acrylic acid and methacrylic acid and alkyl esters thereof), and more preferably a copolymer of monomers including styrene and a (meth)acrylic acid alkyl ester having 1 to 8 carbon atoms in the alkyl group, and even more preferably a copolymer of styrene, a (meth)acrylic acid alkyl ester having 1 to 8 carbon atoms in the alkyl group, and a crosslinking agent added as needed.

Here, the styrene acrylic copolymer may be contained in the binder resin in a state of being composed of only the styrene acrylic copolymer, or in a state of a block copolymer or graft copolymer with another polymer, or a mixture thereof.

By using a binder resin including a monomer unit derived from styrene, in particular a resin including a styrene acrylic copolymer, the plasticizing effect of the ester wax is strongly exerted, and a contribution to low-temperature fixing is increased.

The monomer unit derived from styrene is a monomer unit represented by a following formula (St).

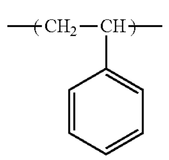
(St)

The amount of the monomer unit derived from styrene in the binder resin is preferably 50% by mass or more, more preferably 65% by mass or more, and further preferably 70% by mass or more. The upper limit is not particularly limited, but is preferably 90% by mass or less, and more preferably 80% by mass or less.

Further, it is preferable that I(10 min), which is the I value after heating the toner to 100° C. and holding for 10 min, be 0.30 or more, more preferably 0.32 or more, and further preferably 0.35 or more. The upper limit is not particularly limited, but is preferably 0.60 or less, and more preferably 0.50 or less.

Satisfying the above amount and I(10 min) indicates that the amount of hydrocarbon wax on the image surface in the output paper tray after fixing is sufficient to suppress sticking.

The amount of the monomer unit derived from styrene in the binder resin can be easily determined by nuclear magnetic resonance spectroscopy (hereinafter referred to as NMR). The toner is added to deuterated chloroform, and the NMR spectrum of protons of the dissolved binder resin is measured. The molar ratio and mass ratio of each monomer can be calculated from the obtained NMR spectrum, and the amount of the monomer unit derived from styrene can be determined.

For example, in the case of a styrene acrylic copolymer, the composition ratio and mass ratio can be calculated based on the peak near 6.5 ppm that is derived from the styrene monomer and the peak near 3.5 ppm to 4.0 ppm that is derived from the acrylic monomer.

Further, for example, when a polyester resin generally known as a binder resin for toner is included, a peak derived from each monomer constituting the polyester resin and a peak derived from a styrene acrylic copolymer are combined to calculate the molar ratio and mass ratio and determine the amount of the monomer unit derived from styrene.

Assuming that the difference (SPb−SPc) between the SP value (SPb) of the ester wax B and the SP value (SPc) of the alkyl chain of the hydrophobizing treatment agent in the inorganic particles C is ΔSP3, ΔSP3 preferably satisfies following formula (5):

$$\Delta SP3 \leq 1.05 \quad (5).$$

ΔSP3 is more preferably 1.02 or less. The lower limit is not particularly limited, but is preferably 0.45 or more, and more preferably 0.55 or more. Within these ranges, low-temperature fixability (tape peelability) tends to improve.

This is conceivably because the effect of plasticizing the binder resin is enhanced by increasing the affinity between the ester wax B and the inorganic particles C. Further, in the toner produced by the suspension polymerization method described hereinbelow, the inorganic particles C tend to be unevenly present near the surface of the toner particle, but the presence ratio of the ester wax B having a high affinity increases accordingly in the vicinity of the surface.

Since it is assumed that the melting characteristics near the toner surface contribute to the fixability more than internal melting characteristics, the presence of the ester wax B having a large plasticizing effect near the toner surface contributes significantly to the improvement in low-temperature fixability.

The toner particle may include a charge control agent.

Organic metal complex compounds and chelate compounds are effective as charge control agents for negative charging, and examples thereof include a monoazo metal complex compound; an acetylacetone metal complex compound; an aromatic hydroxycarboxylic acid or an aromatic dicarboxylic acid metal complex compound, and the like.

Specific examples of commercially available products include Spilon Black TRH, T-77, T-95 (Hodogaya Chemical Co., Ltd.), BONTRON (registered trademark) S-34, S-44, S-54, E-84, E-88, E-89 (Orient Chemical Industry Co., Ltd.).

The charge control agents can be used alone or in combination of two or more.

From the viewpoint of charge quantity of the toner, the amount of the charge control agent is preferably from 0.1 part by mass to 10.0 part by mass and more preferably from 0.1 part by mass to 5.0 parts by mass with respect to 100 parts by mass of the binder resin.

The toner particle may include a colorant such as a pigment or a dye. These can be used alone or in combination of two or more.

Examples of black pigments include carbon black such as furnace black, channel black, acetylene black, thermal black, lamp black and the like. These can be used alone or in combination of two or more.

As a colorant suitable for yellow color, a pigment or a dye can be used.

Examples of the pigment include C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, 191, and C. I. Vat Yellow 1, 3, 20. Examples of the dye include C. I. Solvent Yellow 19, 44, 77, 79, 81, 82, 93, 98, 103, 104, 112, 162 and the like. These can be used alone or in combination of two or more.

As a colorant suitable for cyan color, a pigment or a dye can be used.

Examples of the pigment include C. I. Pigment Blue 1, 7, 15, 15:1, 15:2, 15:3, 15:4, 16, 17, 60, 62, 66, and the like, C. I. Vat Blue 6, and C. I. Acid Blue 45. Examples of the dye include C. I. Solvent Blue 25, 36, 60, 70, 93, 95 and the like. These can be used alone or in combination of two or more.

As a colorant suitable for magenta color, a pigment or a dye can be used.

Examples of the pigment include C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1, 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, 254, and the like, C. I. Pigment Violet 19, and C. I. Vat Red 1, 2, 10, 13, 15, 23, 29, 35.

Examples of magenta dyes include oil-soluble dyes such as C. I. Solvent Red 1, 3, 8, 23, 24, 25, 27, 30, 49, 52, 58, 63, 81, 82, 83, 84, 100, 109, 111, 121, 122, and the like, C. I. Disperse Red 9, C. I. Solvent Violet 8, 13, 14, 21, 27, and the like, C. I. Disperse Violet 1, and basic dyes such as C. I. Basic Red 1, 2, 9, 12, 13, 14, 15, 17, 18, 22, 23, 24, 27, 29, 32, 34, 35, 36, 37, 38, 39, 40, and the like, C. I. Basic Violet 1, 3, 7, 10, 14, 15, 21, 25, 26, 27, 28, and the like. These can be used alone or in combination of two or more.

The amount of the colorant (other than the inorganic particles C) is preferably from 1 part by mass to 20 parts by mass, and more preferably from 2 parts by mass to 15 parts by mass with respect to 100 parts by mass of the binder resin.

The toner may have toner particles and an external additive.

Examples of the external additive include metal oxide fine particles (inorganic fine particles) such as silica fine particles, alumina fine particles, titania fine particles, zinc oxide fine particles, strontium titanate fine particles, cerium oxide fine particles, and calcium carbonate fine particles. Further, composite oxide fine particles using two or more kinds of metals can also be used, or two or more kinds selected in any combination from these fine particle groups can also be used.

Further, resin fine particles and organic-inorganic composite fine particles of resin fine particles and inorganic fine particles can also be used.

It is more preferable that the external additive have at least one selected from the group consisting of silica fine particles and organic-inorganic composite fine particles.

Examples of the silica fine particles include sol-gel silica fine particles produced by a sol-gel method, aqueous colloidal silica fine particles, alcoholic silica fine particles, fumed silica fine particles obtained by a vapor phase method, fused silica fine particles, and the like.

Examples of the resin fine particles include resin particles such as vinyl resin, polyester resin, and silicone resin.

Examples of the organic-inorganic composite fine particles include organic-inorganic composite fine particles composed of resin fine particles and inorganic fine particles.

Where organic-inorganic composite fine particles are used, due to the resin component having a low heat capacity, the coalescence of toner particles is unlikely to be inhibited and fixing is unlikely to be impeded at the time of fixing while maintaining good durability and charging performance due to inorganic fine particles. Therefore, it is easy to achieve both durability and fixability.

The organic-inorganic composite fine particle is preferably a composite fine particle having convex portions composed of inorganic fine particles embedded in the surface of a resin fine particles (preferably a vinyl-based resin fine particle) which is a resin component. A composite fine particle having a structure in which inorganic fine particles are exposed on the surface of a vinyl resin particle is more preferable. A composite fine particle having a structure having convex portions derived from inorganic fine particle on the surface of a vinyl resin fine particle is even more preferable.

Examples of the inorganic fine particles constituting the organic-inorganic composite fine particles include fine particles such as silica fine particles, alumina fine particles, titania fine particles, zinc oxide fine particles, strontium titanate fine particles, cerium oxide fine particles, calcium carbonate fine particles, and the like.

The amount of the external additive is preferably from 0.1 parts by mass to 20.0 parts by mass with respect to 100 parts by mass of the toner particle.

The external additive may be hydrophobized with a hydrophobizing treatment agent.

Examples of the hydrophobizing treatment agent include:

chlorosilanes such as methyltrichlorosilane, dimethyldichlorosilane, trimethylchlorosilane, phenyltrichlorosilane, diphenyldichlorosilane, t-butyldimethylchlorosilane, vinyltrichlorosilane, and the like;

alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and the like;

silazanes such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane, dimethyltetravinyldisilazane, and the like;

silicone oils such as dimethyl silicone oil, methylhydrogen silicone oil, methylphenyl silicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oils, terminal-reactive silicone oil, and the like;

siloxanes such as hexamethylcyclotrisiloxane, octamethylcyclotetrasiloxane, decamethylcyclopentasiloxane, hexamethyldisiloxane, octamethyltrisiloxane, and the like;

fatty acids and metal salts thereof, for example, long-chain fatty acids such as undecylic acid, lauric acid, tridecylic acid, dodecic acid, myristic acid, palmitic acid, pentadecylic acid, stearic acid, heptadecic acid, arachic acid, montanic acid, oleic acid, linoleic acid, arachidonic acid, and the like, and salts of the fatty acids with metals such as zinc, iron, magnesium, aluminum, calcium, sodium, lithium, and the like.

Among these, alkoxysilanes, silazanes, and silicone oils are preferably used because hydrophobization can be easily performed. These hydrophobizing treatment agents may be used alone or in combination of two or more.

The amount of the external additive is preferably from 0.05 parts by mass to 10.0 parts by mass with respect to 100 parts by mass of the toner particles.

A method for producing the toner is illustrated hereinbelow.

A known method such as a pulverization method or a polymerization method can be adopted to produce the toner. Examples of suitable methods include a dispersion polymerization method, an association aggregation method, a dissolution suspension method, a suspension polymerization method, an emulsion agglutination method, and the like.

The suspension polymerization method is more preferable because the inorganic particles C are likely to be present in the vicinity of the surface of the toner particle, and a toner satisfying suitable physical properties can be easily obtained.

The preferred embodiment in the case where the toner is produced by the suspension polymerization method is described below.

In the suspension polymerization method, for example, a polymerizable monomer capable of producing a binder resin, a hydrocarbon wax A and an ester wax B, and, if necessary, inorganic particles C, a colorant, a polymerization initiator, a crosslinking agent, a charge control agent and other additives are uniformly dispersed to obtain a polymerizable monomer composition. Then, the obtained polymerizable monomer composition is dispersed and granulated in a continuous layer (for example, an aqueous phase) including a dispersion stabilizer by using an appropriate stirrer, and a polymerization reaction is carried out using a polymerization initiator to obtain toner particles having a desired particle diameter.

Examples of the polymerizable monomer include the following.

Styrene-based monomers such as styrene, o-methylstyrene, m-methylstyrene, p-methylstyrene, p-methoxystyrene, p-ethylstyrene, and the like.

Acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, behenyl acrylate, 2-chloroethyl acrylate, phenyl acrylate, and the like.

Methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, and the like.

Other monomers such as acrylonitrile, methacrylonitrile, acrylamide, and the like. These monomers may be used alone or in a mixture.

Among the above-mentioned monomers, the use of a styrene-based monomer alone or in combination with other monomers such as acrylic acid esters and methacrylic acid esters is preferable because the toner structure is controlled and the development characteristics and durability of the toner are easily improved. In particular, it is more preferable to use styrene and an acrylic acid ester or styrene and a methacrylic acid ester as main components. That is, it is preferable that the binder resin include 50% by mass or more of the styrene acrylic resin.

A polymer of monomers including styrene, and at least one selected from the group consisting of acrylic acid esters and methacrylic acid esters is preferable.

As the polymerization initiator to be used in the production of toner particles by the suspension polymerization method, those having a half-life of from 0.5 h to 30 h during the polymerization reaction are preferable. Moreover, it is preferable to use the polymerization initiator with the addition amount of from 0.5 parts by mass to 20 mass by mass with respect to 100 mass parts of the polymerizable monomers. As a result, a polymer having a maximum molecular weight between 5000 and 50000 can be obtained, and the toner can be provided with preferable strength and appropriate melting characteristics.

Specific examples of the polymerization initiator include azo- or diazo-based polymerization initiators such as 2,2'-azobis-(2,4-dimethylvaleronitrile), 2,2'-azobisisobutyronitrile, 1,1'-azobis (cyclohexane-1-carbohynitrile), 2,2'-azobis-4-methoxy-2,4-dimethylvaleronitrile, azobisisobutyronitrile and the like; and peroxide-based polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butylperoxy 2-ethylhexanoate, t-butylperoxypivalate, di(2-ethylhexyl) peroxydicarbonate, di(secondary butyl) peroxydicarbonate and the like. Of these, t-butyl peroxypivalate is preferable.

When the toner is produced by a polymerization method, a crosslinking agent may be added. Examples of the crosslinking agent include the following.

Divinylbenzene, 1,6-hexanediol diacrylate, polyethylene glycol #200 diacrylate (A200), polyethylene glycol #400 diacrylate (A400), polyethylene glycol #600 diacrylate (A600), polyethylene glycol #1000 diacrylate (A1000);

Dipropylene glycol diacrylate (APG100), tripropylene glycol diacrylate (APG200), polypropylene glycol #400 diacrylate (APG400), polypropylene glycol #700 diacrylate (APG700), polytetrapropylene glycol #650 diacrylate (A-PTMG-65).

The amount to be added is preferably from 0.05 parts by mass to 15.0 parts by mass, more preferably from 0.10 parts by mass to 10.0 parts by mass, and even more preferably from 0.20 parts by mass to 5.0 parts by mass with respect to 100 parts by mass of the polymerizable monomers.

The above polymerizable monomer composition may include a polar resin.

Examples of the polar resin include homopolymers of styrene and substitution products thereof such as polystyrene, polyvinyltoluene, and the like; styrene-based copolymers such as styrene-propylene copolymer, styrene-vinyltoluene copolymer, styrene-vinylnaphthalin copolymer, styrene-methyl acrylate copolymer, styrene-ethyl acrylate copolymer, styrene-butyl acrylate copolymer, styrene-octyl acrylate copolymer, styrene-dimethylaminoethyl acrylate copolymer, styrene-methyl methacrylate copolymer, styrene-ethyl methacrylate copolymer, styrene-butyl methacrylate copolymer, styrene-dimethylaminoethyl methacrylate copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-maleic acid copolymer, styrene-maleic acid ester copolymer, and the like; polymethyl methacrylate, polybutyl methacrylate, polyvinyl acetate, polyethylene, polypropylene, polyvinyl butyral, silicone resin, polyester resin, styrene-polyester copolymer, polyacrylate-polyester copolymer, polymethacrylate-polyester copolymer, polyamide resin, epoxy resin, polyacrylic acid resin, terpene resin, phenol resin, and the like.

These can be used alone or in a mixture of two or more. Further, a functional group such as an amino group, a carboxy group, a hydroxyl group, a sulfonic acid group, a glycidyl group, a nitrile group, and the like may be introduced into these polymers. Among these resins, polyester resins are preferable.

As the polyester resin, a saturated polyester resin, an unsaturated polyester resin, or both can be appropriately selected and used.

As the polyester resin, a normal polyester resin composed of an alcohol component and an acid component can be used, and both components are illustrated below.

Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, hydrogenated bisphenol A, or bisphenol derivatives represented by a following formula (A); hydrogenation products of the compounds represented by the formula (A), diols represented by a following formula (B), and diols of the hydrogenation products of the compounds represented by the formula (B).

(A)

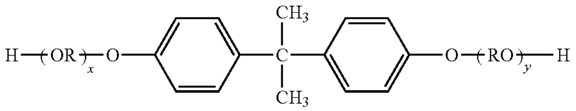

In the formula (A), R is an ethylene group or a propylene group, x and y are each an integer of 1 or more, and the average value of x+y is 2 to 10.

(B)

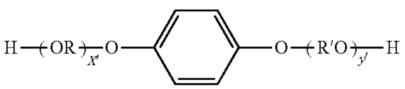

In the formula (B), R' represents $-CH_2CH_2-$, 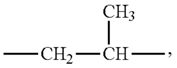, or 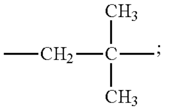;

x' and y' are each integers greater than or equal to 0; and the average value of x'+y' is 0 to 10.

As the divalent alcohol component, an alkylene oxide adduct of the above bisphenol A, which has excellent charging characteristics and environmental stability and is well-balanced in other electrophotographic characteristics, is particularly preferable.

In the case of this compound, the average number of moles of alkylene oxide added is preferably from 2 to 10 in terms of fixability and toner durability.

Examples of the divalent acid component include benzenedicarboxylic acids such as phthalic acid, terephthalic acid, isophthalic acid, and phthalic anhydride or anhydrides thereof; alkyldicarboxylic acids such as succinic acid, adipic acid, sebacic acid, and azelaic acid or anhydrides thereof; succinic acid substituted with an alkyl or alkenyl group having 6 to 18 carbon atoms or an anhydride thereof; unsaturated dicarboxylic acids such as fumaric acid, maleic acid, citraconic acid, and itaconic acid or anhydrides thereof.

Further, examples of the trivalent or higher alcohol component include glycerin, pentaerythritol, sorbit, sorbitan, and an oxyalkylene ether of a novolak phenol resin, and examples of the trivalent or higher acid component include trimellitic acid and pyromellitic acid, 1,2,3,4-butanetetracarboxylic acid, benzophenonetetracarboxylic acid, anhydrides thereof, and the like.

Assuming that the total of the alcohol component and the acid component is 100 mol %, the polyester resin preferably includes from 45 mol % to 55 mol % of the alcohol component.

The polyester resin can be produced using any catalyst such as a tin-based catalyst, an antimony-based catalyst, a titanium-based catalyst, or the like, but it is preferable to use a titanium-based catalyst.

Further, from the viewpoint of developing performance, blocking resistance, and durability, it is preferable that the polar resin have a number average molecular weight of from 2500 to 25000.

The acid value of the polar resin is preferably from 1.0 mg KOH/g to 15.0 mg KOH/g, and more preferably from 2.0 mg KOH/g to 10.0 mg KOH/g.

The amount of the polar resin is preferably from 2 parts by mass to 20 parts by mass with respect to 100 parts by mass of the binder resin.

A dispersion stabilizer may be included in the aqueous medium in which the polymerizable monomer composition is dispersed.

As the dispersion stabilizer, known surfactants, organic dispersing agents, and inorganic dispersing agents can be used. Among these, inorganic dispersing agents can be preferably used because they ensure dispersion stability due to the steric hindrance thereof, so that the stability is not easily lost even when the reaction temperature is changed, and are easily washed and do not adversely affect the toner.

Examples of these inorganic dispersing agents include polyvalent metal salts of phosphoric acid such as tricalcium phosphate, magnesium phosphate, aluminum phosphate, zinc phosphate, hydroxyapatite and the like, carbonates such as calcium carbonate, magnesium carbonate and the like, inorganic salts such as calcium metasilicate, calcium sulfate, barium sulfate and the like, and inorganic compounds such as calcium hydroxide, magnesium hydroxide, aluminum hydroxide and the like.

The amount of the inorganic dispersant added is preferably from 0.2 parts by mass to 20.0 parts by mass with respect to 100.0 parts by mass of the polymerizable monomers. Further, the dispersion stabilizers may be used alone or in combination of two or more. Further, a surfactant in an amount of 0.001 part by mass to 0.1 part by mass may be used in combination.

When an inorganic dispersant is used, it may be used as it is, but in order to obtain finer particles, fine particles of the inorganic dispersant can be generated and used in an aqueous medium.

For example, in the case of tricalcium phosphate, it is possible to mix an aqueous solution of sodium phosphate and an aqueous solution of calcium chloride under high-speed stirring to generate fine particles of water-insoluble calcium phosphate, thereby enabling more uniform and fine dispersion.

Examples of the surfactant include sodium dodecylbenzene sulfate, sodium tetradecyl sulfate, sodium pentadecyl sulfate, sodium octyl sulfate, sodium oleate, sodium laurate, sodium stearate, potassium stearate, and the like.

In the step of polymerizing the polymerizable monomers, the polymerization temperature is usually set to 40° C. or higher, and preferably from 50° C. to 90° C. When the polymerization is carried out in this temperature range, for example, a release agent or the like is precipitated by phase separation to achieve more complete encapsulation.

After that, there is a cooling step of cooling from the reaction temperature of about from 50° C. to 90° C. to end the polymerization reaction step. At that time, gradual cooling may be performed so as to maintain the compatible state of the release agent and the binder resin.

After the polymerization of the polymerizable monomers is completed, the obtained polymer particles are filtered, washed and dried by a known method to obtain toner particles. The toner particles may be used as they are as a toner. The toner may be obtained by mixing an external additive with the toner particles and adhering the external additive to the surface of the toner particles. It is also possible to add a classification step to the production process to cut coarse powder and fine powder contained in the toner particles.

Methods for measuring various physical properties of toners will be described below.

Method for Measuring I(Ini) and I(10 Min) by Heating IR

A pressure of 15 kN is applied to 300 mg of toner by a Newton press for 1 min to prepare a toner pellet with a diameter of 1 cm.

Using the toner pellet as a sample, heating IR measurement is performed under the following conditions.

Equipment: FT-IR, PerkinElmer Co., Frontier

Heating unit: Specac Ltd., MKII Golden Gate Single Reflection ATR System

Heating program: raising the temperature from room temperature to 40° C., holding at 40° C. for 1 min, raising the temperature to 100° C. at 10° C./min, holding at 100° C. for 10 min IR spectrum acquisition conditions: resolution 4 $cm^{-1}$, measurement range 4000-550 $cm^{-1}$, integrated number of times 5

Spectrum acquisition interval: 30 sec

From the obtained IR spectrum, the heights of the peak 2922 $cm^{-1}$ attributed to the hydrocarbon wax A and the peak attributed to the binder resin are measured, and the peak height ratio I of the hydrocarbon wax A to the binder resin is calculated. The position of the peak attributed to the binder resin may be selected according to the composition of the binder resin. The composition of the binder resin can be obtained by "Composition Analysis of Binder Resin" described hereinbelow.

For example, when the binder resin is a styrene acrylic resin, the height of the peak 696 $cm^{-1}$ derived from styrene is measured, and the peak height ratio I of the hydrocarbon wax A to the binder resin is calculated. The value of I at the time of reaching 100° C. is taken as I(ini), and the value of I after holding for 10 min after reaching 100° C. is taken as I(10 min). The arithmetic mean value of the three samples is used.

Method for Calculating SP Value

The solubility parameter (SP value) is obtained using the Fedors formula (2).

The evaporation energy and molar volume (25° C.) of atoms and atomic groups shown in Table 3-9 of "Basic Science of Coating, pp. 54-57, 1986 (Maki Shoten)" are referred to for values of Δei and Δvi below.

The unit of the SP value is $(cal/cm^3)^{1/2}$, but can be converted to the unit of $(J/m^3)^{1/2}$ by 1 $(cal/cm^3)^{1/2}=2.046\times 10^3\ (J/m^3)^{1/2}$.

$$\delta i=(Ev/V)^{1/2}=(\Delta ei/\Delta vi)^{1/2} \quad \text{Formula (2)}$$

Ev: evaporative energy

V: molar volume

Δei: evaporative energy of atoms or atomic groups of i component

Δvi: molar volume of atom or atomic group of i component

Measurement of Molecular Weight of Ester Wax B by Mass Spectrometry

Separation of Wax from Toner

Although it is possible to measure the molecular weight of wax with toner as it is, it is more preferable to perform the separation operation.

The toner is dispersed in ethanol, which is a poor solvent for the toner, and the temperature is raised to a temperature that exceeds the melting point of the wax. At this time, pressurization may be performed if necessary. By this operation, the wax exceeding the melting point is melted and extracted in ethanol. When heating and further pressurization are performed, the wax can be separated from the toner by solid-liquid separation in a pressurized state. Then, the extract is dried and solidified to obtain wax.

Identification and Molecular Weight Measurement of Wax by Pyrolysis GCMS

Mass spectrometer: ISQ, manufactured by Thermo Fisher Scientific Co.

GC device: Focus GC, manufactured by Thermo Fisher Scientific Co.

Ion source temperature: 250° C.

Ionization method: EI

Mass range: 50-1000 m/z

Column: HP-5MS [30 m]

Pyrolysis device: JPS-700, manufactured by Japan Analytical Industry Co., Ltd.

A small amount of wax separated by the extraction operation and 1 μL of tetramethylammonium hydroxide (TMAH) are added to a pyrofoil at 590° C. Pyrolysis GCMS measurement is carried out on the sample under the above conditions to obtain peaks for each of the alcohol component and the carboxylic acid component derived from the ester compound. The alcohol component and the carboxylic acid component are detected as methylation products by the action of TMAH, which is a methylating agent.

The molecular weight can be obtained by analyzing the obtained peak and identifying the structure of the ester wax.

In addition, the hydrocarbon wax has a peak with a distribution due to the decomposition pattern of hydrocarbons. The hydrocarbon wax can be identified by confirming and analyzing this peak.

Identification and Molecular Weight Measurement of Wax by Direct Introduction Method Mass spectrometer: ISQ, manufactured by Thermo Fisher Scientific Co.

Ion source temperature: 250° C.; electron energy: 70 eV

Mass range: 50-1000 m/z (CI)

Reagent Gas: methane (CI)

Ionization method: Direct Exposure Probe DEP, manufactured by Thermo Fisher Scientific Co.

0 mA (10 sec)-10 mA/sec-1000 mA (10 sec)

The wax separated by the extraction operation is placed directly on the filament part of the DEP unit for measurement. The molecular ions of the mass spectrum of the main component peak around 0.5 minutes to 1 minute of the obtained chromatogram are confirmed, and the ester wax is identified to obtain the molecular weight.

Further, since the hydrocarbon wax has a characteristic mass spectrum with a distribution in increments of 14 m/z, confirmation can be made by this mass spectrum.

Identification and Molecular Weight Measurement of Ester Wax by MALDI-TOFMS

A total of 2 mg of the wax separated by the extraction operation is precisely weighed and dissolved by adding 2 ml of chloroform to prepare a sample solution. Next, 20 mg of 2,5-dihydroxybenzoic acid (DHBA) is precisely weighed and dissolved by adding 1 ml of chloroform to prepare a matrix solution. Further, 3 mg of NA trifluoroacetic acid (NATFA) is precisely weighed and then dissolved by adding 1 ml of acetone to prepare an ionization aid solution.

A total of 25 μl of the sample solution, 50 μl of the matrix solution, and 5 μl of the ionization aid solution prepared in this manner are mixed, dropped onto a sample plate for MALDI analysis, and dried to obtain a measurement sample. The sample is measured under the following conditions to obtain a mass spectrum. The ester wax is identified from the obtained mass spectrum and the molecular weight is obtained.

Device: Flextreme, manufactured by Bruker Corp.

Condition: Tof detection mode, Reflect mode

Measurement range: 100-2000 m/z

Laser intensity: 60%

Accumulation number: 3000

Composition Analysis of Binder Resin

Separation Method of Binder Resin

A total of 100 mg of toner is dissolved in 3 ml of chloroform. Next, insoluble matter is removed by suction filtration with a syringe equipped with a sample processing filter (pore size from 0.2 μm to 0.5 for example, using Myshori Disc H-25-2 (manufactured by Tosoh Corporation)).

The soluble component is introduced into a preparative HPLC (device: LC-9130 NEXT, preparative column [60 cm] exclusion limit: 20000, 70000, two columns connected; manufactured by Japan Analytical Industry Co., Ltd.), and a chloroform eluate is delivered. Where the peak can be confirmed on the obtained chromatograph display, the retention time at which the molecular weight becomes 2000 or more is fractionated with a monodisperse polystyrene standard sample. The solution of the obtained fraction is dried and solidified to obtain a binder resin.

Measurement of Composition Ratio and Mass Ratio by Nuclear Magnetic Resonance Spectroscopy (NMR)

A total of 1 mL of deuterated chloroform is added to 20 mg of toner and the NMR spectrum of protons of the dissolved binder resin is measured. The molar ratio and mass ratio of each monomer can be calculated from the obtained NMR spectrum, and a content of monomer unit derived from styrene can be specified.

For example, in the case of a styrene acrylic copolymer, the composition ratio and mass ratio can be calculated based on a peak derived from the styrene monomer near 6.5 ppm and a peak derived from the acrylic monomer around 3.5 to 4.0 ppm.

Further, for example, when a polyester resin generally known as a binder resin for toner is included, the molar ratio and the mass ratio are calculated based on both the peaks derived from each monomer constituting the polyester resin and the peaks derived from a styrene acrylic copolymer to determine the amount of the monomer unit derived from styrene.

NMR device: JEOL RESONANCE ECX500

Observation nucleus: proton; measurement mode: single pulse

Identification of Inorganic Particles C

Inorganic Particle C is a Magnetic Body

A total of 10 mL of chloroform is added to 100 mg of toner, and a homogenizer is operated for 10 min to dissolve the binder resin. Then, the magnetic bodies (inorganic particles C) are recovered by a magnet. The magnetic bodies are isolated by repeating this operation several times.

The obtained magnetic bodies are subjected to pyrolysis GCMS under the above-mentioned conditions. Since a pyrolyzed product of the hydrophobizing treatment agent can be obtained from the measurement results, the carbon number of the hydrophobizing treatment agent is obtained from the main component. The pyrolyzed product is detected as an alkyl substituent of the hydrophobizing treatment agent, a double bond modification thereof, an alkylsilane, or the like.

Inorganic Particle C is not a Magnetic Body

A total of 1 mL of chloroform is added to 100 mg of toner, and a homogenizer is operated for 10 min to dissolve and swell the binder resin. A total of 10 mL of chloroform is added thereto to reprecipitate the resin component and disperse the inorganic particles C in the supernatant. The supernatant allowed to stand is collected and dried to isolate the inorganic particles C.

The obtained inorganic particles C are subjected to pyrolysis GCMS under the above-mentioned conditions. Since a pyrolyzed product of the hydrophobizing treatment agent can be obtained from the measurement results, the carbon number of the hydrophobizing treatment agent is obtained from the main component. The pyrolyzed product is detected as an alkyl substituent of the hydrophobizing treatment agent, a double bond modification thereof, an alkylsilane, or the like.

EXAMPLES

Hereinafter, the present invention will be described in more detail with reference to Examples and Comparative Examples, but the present invention is not limited thereto. Unless otherwise specified, "parts" used in Examples and Comparative Examples are based on mass.

Production Example of Ester Wax B1

A total of 100 parts of stearic acid and 10 parts of ethylene glycol were added to a reaction vessel equipped with a nitrogen introduction tube, a dehydration tube, a stirrer and a thermocouple, and the reaction was carried out at 180° C. and atmospheric pressure for 15 hours under a nitrogen stream while distilling off the reaction water.

The crude esterified product obtained by this reaction was washed with water by adding 20 parts of toluene and 4 parts of ethanol to 100 parts of the crude esterified product, allowing to stand for 30 minutes after stirring, and then removing the aqueous phase (lower layer) separated from the ester phase. The above washing with water was repeated four times until the pH of the aqueous phase reached 7. Then, the solvent was distilled off from the water-washed ester phase at 170° C. and under a reduced pressure condition of 5 kPa to obtain an ester wax B1.

Production Example of Ester Wax B2

An ester wax B2 was obtained by performing the same operations as in the production of the ester wax B1 except that the acid monomer was changed from stearic acid to behenic acid.

Production Example of Ester Wax B3

An ester wax B3 was obtained by performing the same operations as in the production of the ester wax B1 except that the alcohol monomer was changed from ethylene glycol to pentaerythritol.

Production Example of Ester Wax B4

An ester wax B4 was obtained by performing the same operations as in the production of the ester wax B1 except that the alcohol monomer was changed from ethylene glycol to dipentaerythritol and the acid monomer was changed to lauric acid.

Production Example of Ester Wax B5

An ester wax B5 was obtained by performing the same operations as in the production of the ester wax B1 except that the alcohol monomer was changed from ethylene glycol to dipentaerythritol.

Production Example of Ester Wax B6

An ester wax B6 was obtained by performing the same operations as in the production of the ester wax B1 except that the alcohol monomer was changed from ethylene glycol to behenyl alcohol and the acid monomer was changed to sebacic acid.

TABLE 1

| Type of ester wax B | Composition | Molecular weight | SP value (SPb) |
|---|---|---|---|
| Ester wax B1 | Ethylene glycol distearate | 595 | 8.85 |
| Ester wax B2 | Ethylene glycol dibehenate | 707 | 8.81 |
| Ester wax B3 | Pentaerythritol tetrastearate | 1202 | 8.93 |
| Ester wax B4 | Dipentaerythritol hexalaurate | 1348 | 9.14 |
| Ester wax B5 | Dipentaerythritol hexastearate | 1853 | 8.97 |
| Ester wax B6 | Dibehenyl sebacate | 819 | 8.77 |

The unit of SP value in the table is $(cal/cm^3)^{1/2}$. Same hereinbelow.

Production Example of Inorganic Particles C1

A caustic soda solution (including 1% by mass of sodium hexametaphosphate in terms of P with respect to Fe) as 1.0% equivalent with respect to iron ions was mixed with an aqueous solution of ferrous sulfate to prepare an aqueous solution including ferrous hydroxide. Air was blown into the aqueous solution while maintaining the aqueous solution at pH 9 and an oxidation reaction was carried out at 80° C. to prepare a slurry liquid for producing seed crystals.

Next, an aqueous solution of ferrous sulfate was added to the slurry liquid to obtain 1.0 equivalent with respect to the initial amount of alkali (sodium component of caustic soda). An oxidation reaction was advanced while maintaining the slurry liquid at pH 8 and blowing air. At the end of the oxidation reaction, the pH was adjusted to 6, followed by washing with water and drying to obtain magnetic iron oxide in the form of spherical magnetite particles having a number average particle diameter of primary particles of 200 nm.

A total of 10.0 kg of the magnetic iron oxide was put into Simpson Mix-Muller (model MSG-0L manufactured by Shinto Kogyo Co., Ltd.) and pulverized for 30 min.

After that, 95 g of n-decyltrimethoxysilane was added as a silane coupling agent in the same apparatus, and the operation was carried out for 1 h to hydrophobize the surface of the magnetic iron oxide particles with the silane coupling agent, thereby obtaining inorganic particles C1.

Production Example of Inorganic Particles C2 to C6

Inorganic particles C2 to C6 were obtained in the same manner as in the production example of inorganic particles C1, except that the type of the hydrophobizing treatment agent was changed as shown in Table 2.

Production Example of Inorganic Particles C7

Inorganic particles C7 were obtained in the same manner as in the production example of inorganic particles C1, except that a Henschel mixer (model FM-10 manufactured by Nippon Coke Industries Co., Ltd.) was used as a device for pulverizing and hydrophobizing instead of Simpson Mix-Muller, and an alkyl-modified silicone oil (dimethylsilicone and octylmethylsilicone copolymer) was used as a hydrophobizing treatment agent instead of alkylalkoxysilane.

Production Example of Inorganic Particles C8

Inorganic particles C8 were obtained in the same manner as in the production example of inorganic particles C7, except that silica particles having a number average particle diameter of primary particles of 100 nm were used instead of magnetic iron oxide as the inorganic particles to be hydrophobized.

TABLE 2

| Inorganic particles No. | Base material | Surface treatment device | Hydrophobizing treatment agent | Number of carbon atoms in alkyl group | Average primary particle diameter (nm) | SP value of alkyl group (SPc) |
|---|---|---|---|---|---|---|
| C1 | Magnetic iron oxide | MIX-MULLER | n-Decyltrimethoxysilane | C10 | 200 | 8.11 |
| C2 | Magnetic iron oxide | MIX-MULLER | n-Dodecyltrimethoxysilane | C12 | 200 | 8.18 |
| C3 | Magnetic iron oxide | MIX-MULLER | n-Hexyltrimethoxysilane | C6 | 200 | 7.85 |
| C4 | Magnetic iron oxide | MIX-MULLER | n-Hexadecyltrimethoxysilane | C16 | 200 | 8.27 |
| C5 | Magnetic iron oxide | MIX-MULLER | n-Octyltrimethoxysilane | C8 | 200 | 8.01 |
| C6 | Magnetic iron oxide | MIX-MULLER | n-Butyltrimethoxysilane | C4 | 200 | 7.55 |
| C7 | Magnetic iron oxide | Henschel mixer | Alkyl-modified silicone oil | C8 | 200 | 8.01 |
| C8 | Silica | Henschel mixer | Alkyl-modified silicone oil | C8 | 100 | 8.01 |

In the table, the average primary particle diameter indicates the number average particle diameter of primary particles of inorganic particles C.

Production Example of Polyester Resin

Terephthalic acid: 30.0 parts

Trimellitic acid: 5.0 parts

Bisphenol A ethylene oxide (2 mol) adduct: 160.0 parts

Dibutyltin oxide: 0.1 parts

The above materials were placed in a heat-dried two-necked flask, nitrogen gas was introduced into the container to maintain an inert atmosphere and the temperature was raised while stirring. Then, the polycondensation reaction was carried out while raising the temperature from 140° C. to 220° C. for about 12 h, and then the polycondensation reaction was advanced while reducing the pressure in the temperature range of 210° C. to 240° C. to obtain a polyester resin.

The number average molecular weight (Mn) of the polyester resin was 21200, the weight average molecular weight (Mw) was 84500, and the glass transition temperature (Tg) was 79.5° C.

Production of Crystalline Polyester 1

A total of 100.0 parts of sebacic acid as an acid monomer 1 and 89.3 parts of 1,12-dodecanediol as an alcohol monomer were put into a reaction vessel equipped with a nitrogen introduction tube, a dehydration tube, a stirrer, and a thermocouple. The temperature was raised to 140° C. with stirring, heating was performed at 140° C. under a nitrogen atmosphere, and a reaction was carried out for 8 h while distilling off water under normal pressure.

Next, after adding 0.57 parts of tin dioctylate, a reaction was carried out while raising the temperature to 200° C. at 10° C./h. Further, after the reaction was carried out for 2 h after reaching 200° C., the pressure inside the reaction vessel was reduced to 5 kPa or less, and the reaction was carried out at 200° C. while observing the molecular weight to obtain a crystalline polyester 1. When the obtained crystalline polyester 1 was analyzed, the weight average molecular weight was 38000.

Production Example of Toner Particles 1

After adding 450 parts of 0.1 mol/L-$Na_3PO_4$ aqueous solution to 720 parts of ion exchanged water and heating to a temperature of 60° C., 67.7 parts of 1.0 mol/L-$CaCl_2$) aqueous solution was added to obtain an aqueous medium including a dispersion stabilizer.

Styrene: 75.0 parts n-Butyl acrylate: 25.0 parts 1,6-Hexanediol diacrylate (HDDA): 1.0 part Polyester resin: 4.0 parts Inorganic particles C1: 65.0 parts The above formulation was uniformly dispersed and mixed using an attriter (Nippon Cokes & Industry Co., Ltd.).

The obtained monomer composition was heated to a temperature of 60° C., and the following materials were mixed and dissolved therein to prepare a polymerizable monomer composition.

Hydrocarbon wax: 6.0 parts (Fischer-Tropsch wax (HNP-51: manufactured by Nippon Seiro Co., Ltd.))

Ester wax B1: 20.0 parts

Polymerization initiator: 10.0 parts (t-butyl peroxypivalate (25% toluene solution))

The polymerizable monomer composition was put into an aqueous medium, followed by stirring at 12,000 rpm for 15 min with a T. K. Homomixer (Tokushu Kika Kogyo Co., Ltd.) at a temperature of 60° C. and under a nitrogen atmosphere and granulation. Then, stirring was performed with a paddle impeller, and the polymerization reaction was carried out at a reaction temperature of 70° C. for 300 min. After completion of the reaction, the suspension temperature was raised to 100° C. and held for 2 h.

Then, as a cooling step, water at 0° C. was added to the suspension, the suspension was cooled to 30° C. at a rate of 200° C./min, and then the temperature was raised and held at 55° C. for 3 h. Then, the suspension was cooled to 25° C. by natural cooling at room temperature. The cooling rate at that time was 2° C./min. Then, hydrochloric acid was added to the suspension, and the suspension was thoroughly washed to dissolve the dispersion stabilizer, filtered and dried to obtain toner particles 1.

The amount of the monomer unit derived from styrene in the binder resin of the obtained toner particles 1 was 72% by mass. The weight average particle diameter (D4) of the obtained toner particles 1 was confirmed by a Coulter counter Multisizer 3 (manufactured by Beckman Coulter Co., Ltd.) and found to be 7.3 μm. The SP value (SPa) of the hydrocarbon wax HNP-51 was 8.37.

Production Example of Toner 1

A total of 0.3 parts of sol-gel silica fine particles having a number average particle diameter of primary particles of 115 nm was added to 100 parts of toner particles 1 and mixed using an FM mixer (manufactured by Nippon Coke Industries Co., Ltd.). Then, silica fine particles having a number average particle diameter of primary particles of 12 nm were treated with hexamethyldisilazane and then treated with silicone oil, and 0.9 parts of the hydrophobic silica fine particles with a BET specific surface area value of 120 $m^2/g$ after the treatment were added and mixed using an FM mixer (manufactured by Nippon Coke Industries Co., Ltd.) in the same manner to obtain a toner 1. Tables 3 and 4 show the formulations and physical characteristics of the obtained toner 1.

Production Examples of Toners 2 to 19 and Toners 25 to 32

Toners 2 to 19 and toners 25 to 32 were obtained in the same manner as in the production examples of toner particles 1 and toner 1, except that the types and the number of parts of the materials shown in Table 3 were changed. Tables 3 and 4 show the formulations and physical characteristics.

Production Example of Toner 21

After adding 450 parts of 0.1 mol/L-$Na_3PO_4$ aqueous solution to 720 parts of ion exchanged water and heating to a temperature of 60° C., 67.7 parts of 1.0 mol/L-$CaCl_2$) aqueous solution was added to obtain an aqueous medium including a dispersion stabilizer.

Styrene: 75.0 parts n-Butyl acrylate: 25.0 parts 1,6-Hexanediol diacrylate (HDDA): 1.0 part The above formulation was uniformly dispersed and mixed using an attriter (Nippon Cokes & Industry Co., Ltd.).

The obtained monomer composition was heated to a temperature of 60° C., and the following material was mixed and dissolved therein to prepare a polymerizable monomer composition.

Polymerization initiator 10.0 parts (t-butyl peroxypivalate (25% toluene solution))

The polymerizable monomer composition was put into an aqueous medium, followed by stirring at 12,000 rpm for 15 min with a T. K. Homomixer (Tokushu Kika Kogyo Co., Ltd.) at a temperature of 60° C. and under a nitrogen atmosphere and granulation. Then, stirring was performed with a paddle impeller, and the polymerization reaction was carried out at a reaction temperature of 70° C. for 300 min.

Then, the obtained suspension was cooled to room temperature at 3° C./min, hydrochloric acid was added to dissolve the dispersion stabilizer, and the suspension was filtered, washed with water and dried to obtain Resin particles 1.

Resin particles 1: 101.5 parts

Inorganic particles C1: 65.0 parts

Polyester resin: 4.0 parts

Hydrocarbon wax: 6.0 parts (Fischer-Tropsch wax (HNP-51: manufactured by Nippon Seiro Co., Ltd.))

Ester wax B1: 20.0 parts

After premixing the above materials with an FM mixer (manufactured by Nippon Coke Industries Co., Ltd.), melt-kneading was performed using a twin-screw extruder (trade name: PCM-30, manufactured by Ikegai Iron Works Co., Ltd.) and setting the temperature so that the melt temperature at the discharge port was 150° C.

The obtained kneaded product was cooled, roughly pulverized with a hammer mill, and then finely pulverized using a pulverizer (trade name: Turbo Mill T250, manufactured by Turbo Industries, Ltd.).

The obtained finely pulverized product was classified using a multi-division classifier utilizing the Coanda effect to obtain toner particles 21. The amount of the monomer unit derived from styrene in the binder resin in the obtained toner particles 21 was 73% by mass. The weight average particle diameter (D4) of the obtained toner particles 21 was confirmed by a Coulter counter Multisizer 3 (manufactured by Beckman Coulter Co., Ltd.) and found to be 7.3 The SP value (SPa) of the hydrocarbon wax HNP-51 was 8.37.

Using the obtained toner particles 21, a toner 21 was obtained in the same manner as in the method for producing the toner 1. Tables 3 and 4 show formulations and various physical properties of the obtained toner 21.

Production Example of Toner 22

Bisphenol A ethylene oxide adduct (2.0 mol addition): 50.0 mol. parts

Bisphenol A propylene oxide adduct (2.3 mol addition): 50.0 mol. parts

Terephthalic acid: 60.0 mol. parts

Trimellitic anhydride: 20.0 mol. parts

Acrylic acid: 10.0 mol. parts

A total of 70 parts of the polyester monomer mixture was loaded into a four-neck flask, a decompression device, a water separator, a nitrogen gas introduction device, a temperature measuring device and a stirring device were mounted on the flask, and stirring was performed at 160° C. in a nitrogen atmosphere. A mixture of 30 parts of vinyl-based polymerization monomers (styrene: 90.0 mol part, butyl acrylate: 10.0 mol part) constituting a vinyl polymer segment and 2.0 mol part of benzoyl peroxide as a polymerization initiator was added dropwise thereto from a dropping funnel over 4 h.

Then, after reacting at 160° C. for 5 h, the temperature was raised to 20° C., 0.05 parts by mass of tetraisobutyl titanate was added, and the reaction time was adjusted so as to obtain the desired viscosity. After completion of the reaction, the reaction product was taken out from the vessel, cooled and pulverized to obtain a hybrid resin.

Hybrid resin: 101.5 parts

Inorganic particles C1: 65.0 parts

Polyester resin: 4.0 parts

Hydrocarbon wax: 6.0 parts (Fischer-Tropsch wax (HNP-51: manufactured by Nippon Seiro Co., Ltd.))

Ester wax B1: 20.0 parts

After premixing the above materials with an FM mixer (manufactured by Nippon Coke Industries Co., Ltd.), melt-kneading was performed using a twin-screw extruder (trade name: PCM-30, manufactured by Ikegai Iron Works Co., Ltd.) and setting the temperature so that the melt temperature at the discharge port was 150° C.

The obtained kneaded product was cooled, roughly pulverized with a hammer mill, and then finely pulverized using a pulverizer (trade name: Turbo Mill T250, manufactured by Turbo Industries, Ltd.).

The obtained finely pulverized product was classified using a multi-division classifier utilizing the Coanda effect to obtain toner particles 22. The amount of the monomer unit derived from styrene in the binder resin in the obtained toner particles 22 was 26% by mass. The weight average particle diameter (D4) of the obtained toner particles 22 was confirmed by a Coulter counter Multisizer 3 (manufactured by Beckman Coulter Co., Ltd.) and found to be 7.2

Using the obtained toner particles 22, a toner 22 was obtained in the same manner as in the method for producing the toner 1. Tables 3 and 4 show formulations and various physical properties of the obtained toner 22.

Production Examples of Toners 23, 33, and 34

Toners 23, 33, and 34 were obtained in the same manner as in the production example of toner 21, except that the types and the number of parts of the materials shown in Table 3 were changed. Tables 3 and 4 show the formulations and physical characteristics.

Production Example of Toner 24

Toner particles 24 were obtained in the same manner in as in the production example of toner particles 21, except that 5 parts of the inorganic particles C8 and 5 parts of the copper phthalocyanine were added as shown in Table 3. A toner 24 was obtained in the same manner as in the production example of toner 1 by using the obtained toner particles 24. Tables 3 and 4 show the formulations and physical characteristics of the obtained toner 24.

Production Example of Toner 20

A toner 20 was produced by the emulsification and aggregation method according to the following procedure.

Preparation of Resin Particle-Dispersed Solution A

After adding 450 parts of 0.1 mol/L-$Na_3PO_4$ aqueous solution to 720 parts of ion exchanged water and heating to a temperature of 60° C., 67.7 parts of 1.0 mol/L-$CaCl_2$) aqueous solution was added to obtain an aqueous medium including a dispersion stabilizer.

Styrene: 75.0 parts n-Butyl acrylate: 25.0 parts 1,6-Hexanediol diacrylate (HDDA): 1.0 part The above formulation was uniformly dispersed and mixed using an attriter (Nippon Cokes & Industry Co., Ltd.).

The obtained monomer composition was heated to a temperature of 60° C., and the following material was mixed and dissolved therein to prepare a polymerizable monomer composition.

Polymerization initiator 10.0 parts (t-butyl peroxypivalate (25% toluene solution))

The polymerizable monomer composition was put into an aqueous medium, followed by stirring at 12,000 rpm for 15 min with a T. K. Homomixer (Tokushu Kika Kogyo Co., Ltd.) at a temperature of 60° C. and under a nitrogen atmosphere and granulation. Then, stirring was performed with a paddle impeller, and the polymerization reaction was carried out at a reaction temperature of 70° C. for 300 min.

Then, the obtained suspension was cooled to room temperature at 3° C./min, hydrochloric acid was added to dissolve the dispersion stabilizer, and the suspension was filtered, washed with water and dried to obtain Resin particles 1.

The following components were put into a round bottom flask and stirred.

Resin particles 1: 100.0 parts

Ethyl acetate: 60.0 parts

Isopropyl alcohol: 15.0 parts

After confirming that the resin particles 1 were sufficiently mixed, 3.0 parts of a 10% aqueous ammonia solution was added. Then, 1000 parts of ion exchanged water was added dropwise and a resin emulsion was obtained by phase-transfer emulsification. Next, a resin particle-dispersed liquid A was obtained by removing the organic solvents (ethyl acetate, isopropyl alcohol) under reduced pressure by using an evaporator. When the size of the resin particles in the dispersion liquid A was measured using a particle size measuring device (LA-700, manufactured by HORIBA, Ltd.), the average particle diameter was 0.15

Preparation of Wax-Dispersed Solution A

The following components were put into a predetermined container.

Hydrocarbon wax (HNP-51, manufactured by Nippon Seiro Co., Ltd.): 100.0 parts

Anionic surfactant (Neogen RK, manufactured by DKS Co., Ltd.): 10.0 parts

Ion exchanged water: 390.0 parts

Next, the loaded components were dispersed by using a homogenizer (Ultra-Turrax T50, manufactured by IKA Works, Inc.) while heating at 95° C., and then dispersed by a pressure discharge type homogenizer to prepare a wax-dispersed solution A in which the wax component was dispersed. When measured using a particle diameter measuring device (LA-700, manufactured by HORIBA, Ltd.), the average particle diameter was 0.30

Preparation of Wax-Dispersed Solution B

The following components were put into a predetermined container.

Ester wax B1: 100.0 parts

Anionic surfactant (Neogen RK, manufactured by DKS Co., Ltd.): 10.0 parts

Ion exchanged water: 390.0 parts

Next, the loaded components were dispersed by using a homogenizer (Ultra-Turrax T50, manufactured by IKA Works, Inc.) while heating at 95° C., and then dispersed by a pressure discharge type homogenizer to prepare a wax-dispersed solution B in which the wax component was dispersed. When measured using a particle diameter measuring device (LA-700, manufactured by HORIBA, Ltd.), the average particle diameter was 0.30 μm.

Preparation of Magnetic Body-Dispersed Solution

A magnetic body-dispersed solution was obtained by dispersing the following components with a homogenizer (Ultra-Turrax T50, manufactured by IKA Works, Inc.) for 30 min.

Inorganic particles C1: 100.0 parts

Anionic surfactant (Neogen SC, manufactured by DKS Co., Ltd.): 10.0 parts

Ion exchanged water: 290.0 parts

Preparation of Toner Particles 20

The following components and ion exchanged water in an amount ensuring solid fraction concentration of 15% were put into a separable flask equipped with a stirrer, a cooling tube, and a thermometer.

Resin particle-dispersed solution A: 100.0 parts as solid fraction

Wax-dispersed solution A: 6.0 parts as solid fraction

Wax-dispersed solution B: 20.0 parts as solid fraction

Magnetic body-dispersed solution: 65.0 parts as solid fraction

Next, the contents of the flask were thoroughly mixed using a homogenizer (Ultra-Turrax T50, manufactured by IKA Works, Inc.). Then, 0.36 part of polyaluminum chloride was gradually added as a flocculant, and then dispersion with the homogenizer was continued for 30 min. After 30 min, the contents were heated to 50° C., the resin particle-dispersed solution B was slowly added in an amount of 25.0 parts as a solid fraction.

After that, an appropriate amount of sodium hydroxide aqueous solution was added to adjust the pH in the system to 6.9, followed by heating to 85° C. under stirring and holding for 3 h. After cooling, filtration was performed, the solid fraction was sufficiently washed with ion exchanged water, and then the solid fraction was dried and classified using a multi-division classifier utilizing the Coanda effect to obtain toner particles 20.

The amount of the monomer unit derived from styrene in the binder resin of the obtained toner particles 20 was 73% by mass. The weight average particle diameter (D4) of the obtained toner particles 1 was confirmed by a Coulter counter Multisizer 3 (manufactured by Beckman Coulter Co., Ltd.) and found to be 7.1 μm.

Production of Toner 20

Using the obtained toner particles 20, the toner 20 was obtained in the same manner as in the production example of toner 1.

Tables 3 and 4 show the formulations and various physical properties of the obtained toner 20.

TABLE 3

| Example No. | Toner No. | Toner production method | Binder resin A St | Binder resin A BA | Binder resin A PES | Inorganic particles C No. | Inorganic particles C Parts | Ester wax No. | Ester wax Parts | Crystalline polyester Type | Crystalline polyester Parts | Hydrocarbon wax Type | Hydrocarbon wax Parts |
|---|---|---|---|---|---|---|---|---|---|---|---|---|---|
| 1 | 1 | SP | 75 | 25 | — | C1 | 65.0 | B1 | 20.0 | — | — | HNP51 | 6.0 |
| 2 | 2 | SP | 75 | 25 | — | C1 | 65.0 | B1 | 30.0 | — | — | HNP51 | 6.0 |
| 3 | 3 | SP | 75 | 25 | — | C1 | 65.0 | B1 | 10.0 | — | — | HNP51 | 6.0 |
| 4 | 4 | SP | 75 | 25 | — | C1 | 95.0 | B1 | 20.0 | — | — | HNP51 | 6.0 |
| 5 | 5 | SP | 75 | 25 | — | C1 | 45.0 | B1 | 20.0 | — | — | HNP51 | 6.0 |
| 6 | 6 | SP | 75 | 25 | — | C2 | 65.0 | B1 | 20.0 | — | — | HNP51 | 6.0 |
| 7 | 7 | SP | 75 | 25 | — | C3 | 65.0 | B1 | 20.0 | — | — | HNP51 | 6.0 |
| 8 | 8 | SP | 75 | 25 | — | C1 | 65.0 | B2 | 20.0 | — | — | HNP51 | 6.0 |
| 9 | 9 | SP | 75 | 25 | — | C2 | 65.0 | B2 | 20.0 | — | — | HNP51 | 6.0 |
| 10 | 10 | SP | 75 | 25 | — | C3 | 65.0 | B2 | 20.0 | — | — | HNP51 | 6.0 |
| 11 | 11 | SP | 75 | 25 | — | C4 | 65.0 | B1 | 20.0 | — | — | HNP51 | 6.0 |
| 12 | 12 | SP | 75 | 25 | — | C5 | 65.0 | B3 | 20.0 | — | — | HNP51 | 6.0 |
| 13 | 13 | SP | 75 | 25 | — | C2 | 65.0 | B4 | 20.0 | — | — | HNP51 | 6.0 |
| 14 | 14 | SP | 75 | 25 | — | C5 | 65.0 | B5 | 20.0 | — | — | HNP51 | 6.0 |
| 15 | 15 | SP | 75 | 25 | — | C4 | 65.0 | B3 | 20.0 | — | — | HNP51 | 6.0 |
| 16 | 16 | SP | 75 | 25 | — | C3 | 65.0 | B3 | 20.0 | — | — | HNP51 | 6.0 |
| 17 | 17 | SP | 75 | 25 | — | C6 | 65.0 | B4 | 20.0 | — | — | HNP51 | 6.0 |
| 18 | 18 | SP | 75 | 25 | — | C4 | 65.0 | B4 | 20.0 | — | — | HNP51 | 6.0 |
| 19 | 19 | SP | 75 | 25 | — | C1 | 65.0 | B1 | 20.0 | — | — | HNP51 | 2.0 |
| 20 | 20 | EP | 75 | 25 | — | C1 | 65.0 | B1 | 20.0 | — | — | HNP51 | 6.0 |
| 21 | 21 | P | 75 | 25 | — | C1 | 65.0 | B1 | 20.0 | — | — | HNP51 | 6.0 |
| 22 | 22 | P | 26 | 4 | 70 | C1 | 65.0 | B1 | 20.0 | — | — | HNP51 | 6.0 |
| 23 | 23 | P | 75 | 25 | — | C7 | 65.0 | B1 | 20.0 | — | — | HNP51 | 6.0 |
| 24 | 24 | P | 75 | 25 | — | C8 | 5.0 | B1 | 20.0 | — | — | HNP51 | 6.0 |
| 25 | 25 | SP | 75 | 25 | — | C2 | 65.0 | B4 | 20.0 | — | — | HNP51 | 2.0 |
| 26 | 26 | SP | 75 | 25 | — | C4 | 65.0 | B3 | 20.0 | — | — | HNP51 | 2.0 |
| 27 | 27 | SP | 75 | 25 | — | C6 | 65.0 | B3 | 20.0 | — | — | HNP51 | 6.0 |
| C.E. 1 | 28 | SP | 75 | 25 | — | — | — | B1 | 15.0 | — | — | HNP51 | 3.0 |
| C.E. 2 | 29 | SP | 75 | 25 | — | C6 | 90.0 | B1 | 10.0 | Crystalline polyester 1 | 10.0 | — | — |
| C.E. 3 | 30 | SP | 75 | 25 | — | C1 | 90.0 | — | — | Crystalline polyester 1 | 8.0 | HNP51 | 15.0 |
| C.E. 4 | 31 | SP | 75 | 25 | — | C1 | 100.0 | — | — | — | — | HNP51 | 15.0 |
| C.E. 5 | 32 | SP | 75 | 25 | — | — | — | B1 | 10.0 | — | — | — | — |
| C.E. 6 | 33 | P | 75 | 25 | — | C1 | 65.0 | B 6 | 5.0 | — | — | HNP51 | 5.0 |
| C.E. 7 | 34 | P | 72 | 28 | — | C6 | 65.0 | B1 | 20.0 | — | — | HNP51 | 3.0 |

In the table,
"C.E." denotes "Comparative example",
"SP" denotes "Suspension polymerization",
"EP" denotes "Emulsion polymerization", and
"P" denotes "Pulverizing".

TABLE 4

| | | Heating IR measurement results I (ini)/I (10 min) | Heating IR measurement results I (10 min) | SP value ΔSP1-ΔSP2 | SP value ΔSP2 | SP value ΔSP1 | SP value ΔSP3 |
|---|---|---|---|---|---|---|---|
| Example 1 | Toner 1 | 0.85 | 0.45 | −0.22 | 0.48 | 0.26 | 0.74 |
| Example 2 | Toner 2 | 0.83 | 0.48 | −0.22 | 0.48 | 0.26 | 0.74 |
| Example 3 | Toner 3 | 0.88 | 0.42 | −0.22 | 0.48 | 0.26 | 0.74 |
| Example 4 | Toner 4 | 0.85 | 0.40 | −0.22 | 0.48 | 0.26 | 0.74 |
| Example 5 | Toner 5 | 0.88 | 0.48 | −0.22 | 0.48 | 0.26 | 0.74 |
| Example 6 | Toner 6 | 0.85 | 0.45 | −0.29 | 0.48 | 0.19 | 0.67 |
| Example 7 | Toner 7 | 0.88 | 0.42 | 0.04 | 0.48 | 0.52 | 1.00 |
| Example 8 | Toner 8 | 0.87 | 0.42 | −0.18 | 0.44 | 0.26 | 0.70 |
| Example 9 | Toner 9 | 0.87 | 0.45 | −0.25 | 0.44 | 0.19 | 0.63 |
| Example 10 | Toner 10 | 0.89 | 0.35 | 0.08 | 0.44 | 0.52 | 0.96 |
| Example 11 | Toner 11 | 0.90 | 0.35 | −0.38 | 0.48 | 0.10 | 0.58 |
| Example 12 | Toner 12 | 0.91 | 0.35 | −0.20 | 0.56 | 0.36 | 0.92 |
| Example 13 | Toner 13 | 0.90 | 0.35 | −0.58 | 0.77 | 0.19 | 0.96 |
| Example 14 | Toner 14 | 0.91 | 0.35 | −0.24 | 0.60 | 0.36 | 0.96 |
| Example 15 | Toner 15 | 0.91 | 0.32 | −0.46 | 0.56 | 0.10 | 0.66 |
| Example 16 | Toner 16 | 0.92 | 0.30 | −0.04 | 0.56 | 0.52 | 1.08 |
| Example 17 | Toner 17 | 0.93 | 0.30 | 0.05 | 0.77 | 0.82 | 1.59 |
| Example 18 | Toner 18 | 0.92 | 0.28 | −0.67 | 0.77 | 0.10 | 0.87 |
| Example 19 | Toner 19 | 0.90 | 0.28 | −0.22 | 0.48 | 0.26 | 0.74 |
| Example 20 | Toner 20 | 0.93 | 0.28 | −0.22 | 0.48 | 0.26 | 0.74 |
| Example 21 | Toner 21 | 0.93 | 0.28 | −0.22 | 0.48 | 0.26 | 0.74 |
| Example 22 | Toner 22 | 0.93 | 1.20 | −0.22 | 0.48 | 0.26 | 0.74 |
| Example 23 | Toner 23 | 0.93 | 0.25 | −0.22 | 0.48 | 0.26 | 0.74 |

TABLE 4-continued

| | | Heating IR measurement results | | SP value | | | |
|---|---|---|---|---|---|---|---|
| | | I (ini)/ I (10 min) | I (10 min) | ΔSP1-Δ SP2 | ΔSP2 | ΔSP1 | ΔSP3 |
| Example 24 | Toner 24 | 0.93 | 0.25 | −0.22 | 0.48 | 0.26 | 0.74 |
| Example 25 | Toner 25 | 0.94 | 0.25 | −0.58 | 0.77 | 0.19 | 0.96 |
| Example 26 | Toner 26 | 0.94 | 0.25 | −0.46 | 0.56 | 0.10 | 0.66 |
| Example 27 | Toner 27 | 0.95 | 0.25 | 0.26 | 0.56 | 0.82 | 1.38 |
| C.E. 1 | Toner 28 | 0.98 | 0.20 | — | 0.48 | — | — |
| C.E. 2 | Toner 29 | 1.00 | 0.25 | — | — | — | 0.74 |
| C.E. 3 | Toner 30 | 0.98 | 0.45 | — | — | 0.26 | — |
| C.E. 4 | Toner 31 | 0.98 | 0.45 | — | — | 0.26 | — |
| C.E. 5 | Toner 32 | 1.00 | 0.22 | — | — | — | — |
| C.E. 6 | Toner 33 | 0.98 | 0.25 | −0.14 | 0.40 | 0.26 | 0.66 |
| C.E. 7 | Toner 34 | 0.98 | 0.22 | 0.34 | 0.48 | 0.82 | 1.30 |

In the table,
"C.E." denotes "Comparative example".

An HP printer (Color LaserJet Enterprise M552) modified by increasing the process speed by a factor of 1.5 and setting the fixing nip pressure to 80% of the default setting was used as an evaluation electrophotographic apparatus. Further, CF230X was used as a toner cartridge, 150 g of toner was filled, and the following evaluation was carried out.

A4 color laser copy paper (Canon Red Label 80 $g/m^2$) was used as the printing paper in the evaluation of low-temperature fixing. Since this paper is the thickest of the usual types of paper, rigorous evaluation of printing can be performed.

A4 color laser copy paper (manufactured by Canon, 70 $g/m^2$) was used as the printing paper in the evaluation of output paper sticking. Since this paper is relatively thin, heat is easily transferred to the toner layer. Therefore, the toner is easily melted and the image sticking is likely to occur, so that the evaluation can be performed under stricter conditions. The evaluation results are shown in Table 5.

Tape Peeling Resistance (Low-Temperature Fixability), Low-Temperature and Low-Humidity Environment The tape peeling resistance was evaluated in a low-temperature and low-humidity environment (temperature 15° C., relative humidity 10%), which is a strict environment for evaluation of low-temperature fixability.

Specifically, the fixing temperature was changed in increments of 5° C., and at each temperature, an image was output in which 10 vertical lines of 4 dots were arranged at intervals of 5 mm with a top margin of 250 mm and a left and right margin of 80 mm.

Then, a polyester tape (No. 5515 manufactured by Nichiban Co., Ltd.) was attached to the portion with 10 vertical lines of the image obtained at each temperature control, and a load of 100 g was applied back and forth three times to the polyester tape to bring the polyester tape image into close contact with the image. Then, the temperature at which the number of lines where chipping or peeling occurred was one or less after the polyester tape was peeled off was taken as a lower limit temperature for fixing, and it was determined that the lower the lower limit temperature for fixing, the better the fixability.

A. The lower limit temperature for fixing is less than 190° C.
B. The lower limit temperature for fixing is 190° C. or higher and lower than 200° C.
C. The lower limit temperature for fixing is 200° C. or higher and lower than 210° C.
D. The lower limit temperature for fixing is 210° C. or higher.

Double-Sided Printing Mode, Evaluation of Output Paper Sticking, Double-Sided Character Printing Image, Toner-Paper Adhesion The lower limit temperature obtained in the above evaluation of low-temperature fixability was set as the fixing temperature, and 200 character images were printed continuously in the double-sided printing mode. The paper bundle discharged from the paper discharge portion was allowed to stand in a stacked state for 30 min or more and cooled to room temperature.

After that, the front and back images were checked one by one for 50 sheets from the 76th to the 125th sheets of the paper bundle, and the image sticking was evaluated by the number of blank dots. Here, the sticking when the character images are continuously printed is an evaluation of toner-paper adhesion.

Where the sticking of the output paper can be suppressed, the number of blank dots in the character image is small. Meanwhile, where the sticking of the output paper cannot be suppressed, blank dots appear when sticking occurs in the paper bundle due to toner-paper adhesion and the number of blank dots increases.

A. The number of blank dots is less than five.
B. The number of blank dots is 5 or more and less than 20.
C. The number of blank dots is 20 or more and less than 40.
D. The number of blank dots is 40 or more.

Double-Sided Printing Mode, Evaluation of Output Paper Sticking, Double-Sided Solid Printing Image, Toner-Toner Adhesion The lower limit temperature obtained in the above evaluation of low-temperature fixability was set as the fixing temperature, and 200 solid images were continuously printed in the double-sided printing mode. The paper bundle discharged from the paper discharge portion was allowed to stand in a stacked state for 30 min or more, and cooled to room temperature.

After that, the front and back images were checked one by one for 50 sheets from the 76th to the 125th sheets of the paper bundle, and the image sticking was evaluated by the number of blank dots. Here, the sticking when the solid images are continuously printed is an evaluation of toner-toner adhesion.

Where the sticking of the output paper can be suppressed, the number of blank dots in the solid image is small. Meanwhile, where the sticking of the output paper cannot be suppressed, blank dots appear when sticking occurs in the paper bundle due to toner-toner adhesion and the number of blank dots increases.

A. The number of blank dots is less than five.

B. The number of blank dots is 5 or more and less than 20.

C. The number of blank dots is 20 or more and less than 40.

D. The number of blank dots is 40 or more.

Double-Sided Printing Mode after Allowing to Stand Under High-Temperature and High-Humidity Severe Conditions, Evaluation of Output Paper Sticking, Double-Sided Character Printing Image, Toner-Paper Adhesion A total of 150 g of toner was allowed to stand for 30 days in a high-temperature and high-humidity environment of 45° C. and 95% RH. The toner was put into a toner cartridge, and the output paper stickiness of the double-sided character printed image was evaluated in the same manner as in the above method.

TABLE 5

| Example | Toner | Low-temperature fixability (tape peeling) | | Output paper sticking (character image) | | Output paper sticking (solid image) | | Output paper sticking after allowing to stand under severe conditions (character image) | |
|---|---|---|---|---|---|---|---|---|---|
| | | LLF | | | | | | | |
| No. | No. | (° C.) | Rank | NB | Rank | NB | Rank | NB | Rank |
| 1 | 1 | 180 | A | 0 | A | 3 | A | 0 | A |
| 2 | 2 | 180 | A | 0 | A | 3 | A | 3 | A |
| 3 | 3 | 180 | A | 0 | A | 5 | A | 0 | A |
| 4 | 4 | 180 | A | 0 | A | 3 | A | 0 | A |
| 5 | 5 | 180 | A | 0 | A | 4 | A | 2 | A |
| 6 | 6 | 180 | A | 0 | A | 2 | A | 4 | A |
| 7 | 7 | 180 | A | 0 | A | 4 | A | 2 | A |
| 8 | 8 | 180 | A | 0 | A | 3 | A | 0 | A |
| 9 | 9 | 180 | A | 0 | A | 3 | A | 0 | A |
| 10 | 10 | 180 | A | 0 | A | 4 | A | 3 | A |
| 11 | 11 | 180 | A | 3 | A | 10 | B | 5 | B |
| 12 | 12 | 190 | B | 0 | A | 3 | A | 0 | A |
| 13 | 13 | 190 | B | 0 | A | 4 | A | 0 | A |
| 14 | 14 | 190 | B | 0 | A | 4 | A | 0 | A |
| 15 | 15 | 190 | B | 3 | A | 12 | B | 6 | B |
| 16 | 16 | 200 | C | 0 | A | 3 | A | 0 | A |
| 17 | 17 | 200 | C | 4 | A | 12 | B | 8 | B |
| 18 | 18 | 190 | B | 16 | B | 25 | C | 20 | C |
| 19 | 19 | 180 | A | 10 | B | 18 | B | 12 | B |
| 20 | 20 | 180 | A | 11 | B | 19 | B | 21 | C |
| 21 | 21 | 180 | A | 13 | B | 18 | B | 23 | C |
| 22 | 22 | 180 | A | 14 | B | 25 | C | 23 | C |
| 23 | 23 | 180 | A | 15 | B | 18 | B | 21 | C |
| 24 | 24 | 200 | C | 18 | B | 19 | B | 35 | C |
| 25 | 25 | 190 | B | 10 | B | 15 | B | 14 | B |
| 26 | 26 | 190 | B | 14 | B | 23 | C | 25 | C |
| 27 | 27 | 200 | C | 25 | C | 23 | C | 38 | C |
| C.E. 1 | 28 | 180 | A | 42 | D | 55 | D | 60 | D |
| C.E. 2 | 29 | 190 | B | 30 | C | 50 | D | 56 | D |
| C.E. 3 | 30 | 210 | D | 16 | B | 25 | C | 23 | C |
| C.E. 4 | 31 | 210 | D | 17 | B | 26 | C | 28 | C |
| C.E. 5 | 32 | 200 | C | 42 | D | 53 | D | 50 | D |
| C.E. 6 | 33 | 200 | C | 31 | C | 45 | D | 42 | D |
| C.E. 7 | 34 | 180 | A | 45 | D | 56 | D | 55 | D |

In the table,

"C.E." denotes "Comparative example",

"LLF" denotes "Lower limit temperature for fixing", and

"NB" denotes "Number of blank dots".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-188685, filed Nov. 12, 2020, which is hereby incorporated by reference herein in its entirety.

What is claimed is:

1. A toner, comprising:

a toner particle, the toner particle comprising a binder resin, a hydrocarbon wax A, an ester wax B, and an inorganic particle C hydrophobized with a hydrophobizing treatment agent;

the binder resin comprising at least 50% by mass of a monomer unit represented by formula (St)

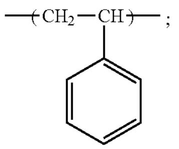

(St)

ester wax B being ethylene glycol distearate or ethylene glycol dibehenate; and the hydrophobizing treatment agent having an alkyl chain, wherein the toner particle does not contain crystalline polyester, $$-0.29 \leq \Delta SP1 - \Delta SP2 \leq 0.08$$

$$0.41 \leq \Delta SP2 \leq 1.00 \text{ and}$$

$$0.10 \leq \Delta SP1 \leq 0.82$$

where ΔSP1 is a difference between an SP value (SPa) $(cal/cm^3)^{1/2}$ of the hydrocarbon wax A and an SP value (SPc) $(cal/cm^3)^{1/2}$ of the alkyl chain, and ΔSP2 is a difference between an SP value (SPb) $(cal/cm^3)^{1/2}$ of the ester wax B and the SP value (SPa) of the hydrocarbon wax A, I(ini)/I(10 min)≤0.95 when I is a peak intensity ratio of a peak intensity attributed to the hydrocarbon wax A to a peak intensity attributed to the binder resin in heating IR measurement in which the toner is held at 100° C. for 10 min, I(ini) is an initial peak intensity ratio upon heating to 100° C., and I(10 min) is a peak intensity ratio upon heating to 100° C. and holding for 10 min, and I(10 min) is at least 0.30 and not more than 0.60.

2. The toner according to claim 1, wherein inorganic particle C is a magnetic body.

3. The toner according to claim 1, wherein ΔSP3≤1.05 when ΔSP3 is a difference between an SP value (SPb) $(cal/cm^3)^{1/2}$ of the ester wax B and an SP value (SPc) $(cal/cm^3)^{1/2}$ of the alkyl chain.

4. The toner according to claim 1, wherein the hydrophobizing treatment agent has an alkyl chain, and an SP value (SPc) $(cal/cm^3)^{1/2}$ of the alkyl chain is 7.50 to 8.50.

5. The toner according to claim 1, wherein the hydrophobizing treatment agent comprises an alkyltrialkoxysilane coupling agent represented by formula (I)

$$C_pH_{2p+1}\text{—Si—}(OC_qH_{2q+1})_3 \quad \text{(I)}$$

where p is an integer of 6 to 12, and q is an integer of 1 to 3.

6. The toner according to claim 1, wherein the toner particle comprises 5.0 to 35.0 parts by mass of ester wax B with respect to 100.0 parts by mass of binder resin in the toner particle.

7. The toner according to claim 1, wherein the toner particle comprises 3.0 to 15.0 parts by mass of hydrocarbon wax A with respect to 100.0 parts by mass of binder resin in the toner particle.

8. A toner, comprising:

a toner particle, the toner particle comprising a binder resin, a hydrocarbon wax A, and an ester wax B, and an inorganic particle C hydrophobized with a hydrophobizing treatment agent;

the binder resin comprising at least 50% by mass of a monomer unit represented by formula (St)

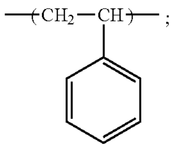

(St)

the toner particle comprising, as a resin component, only one resin selected from the group consisting of an amorphous polyester, a styrene acrylic copolymer, and a hybrid resin comprising an amorphous polyester segment and a vinyl polymer segment;

ester wax B being ethylene glycol distearate or ethylene glycol dibehenate; and the hydrophobizing treatment agent having an alkyl chain, wherein $$-0.29 \leq \Delta SP1 - \Delta SP2 \leq 0.08$$

$$0.41 \leq \Delta SP2 \leq 1.00 \text{ and}$$

$$0.10 \leq \Delta SP1 \leq 0.82$$

where ΔSP1 is a difference between an SP value (SPa) $(cal/cm^3)^{1/2}$ of the hydrocarbon wax A and an SP value (SPc) $(cal/cm^3)^{1/2}$ of the alkyl chain, and ΔSP2 is a difference between an SP value (SPb) $(cal/cm^3)^{1/2}$ of the ester wax B and the SP value (SPa) of the hydrocarbon wax A, I(ini)/I(10 min)≤0.95 when I is a peak intensity ratio of a peak intensity attributed to the hydrocarbon wax A to a peak intensity attributed to the binder resin in heating IR measurement in which the toner is held at 100° C. for 10 min, I(ini) is an initial peak intensity ratio upon heating to 100° C., and I(10 min) is a peak intensity ratio upon heating to 100° C. and holding for 10 min, and I(10 min) is at least 0.30 and not more than 0.60.

9. The toner according to claim 1, wherein the hydrophobizing treatment agent is utilized in an amount of 0.3 to 2.0 parts by mass with respect to 100 parts by mass of untreated inorganic particles.

10. The toner according to claim 5, wherein the hydrophobizing treatment agent is utilized in an amount of 0.3 to 2.0 parts by mass with respect to 100 parts by mass of untreated inorganic particles.

11. The toner according to claim 8, wherein the resin component comprises only one resin selected from the group consisting of an amorphous polyester and a styrene acrylic copolymer.

* * * * *